United States Patent
Tsukagoshi

(10) Patent No.: US 10,225,600 B2
(45) Date of Patent: Mar. 5, 2019

(54) TRANSMISSION DEVICE, TRANSMISSION METHOD, REPRODUCTION DEVICE AND REPRODUCTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/558,616

(22) PCT Filed: Apr. 8, 2016

(86) PCT No.: PCT/JP2016/061481
§ 371 (c)(1),
(2) Date: Sep. 15, 2017

(87) PCT Pub. No.: WO2016/167187
PCT Pub. Date: Oct. 20, 2016

(65) Prior Publication Data
US 2018/0084298 A1 Mar. 22, 2018

(30) Foreign Application Priority Data
Apr. 13, 2015 (JP) .................................. 2015-082099

(51) Int. Cl.
*H04N 7/00* (2011.01)
*H04N 11/00* (2006.01)
(Continued)

(52) U.S. Cl.
CPC ......... *H04N 21/431* (2013.01); *H04N 21/236* (2013.01); *H04N 21/2362* (2013.01);
(Continued)

(58) Field of Classification Search
CPC ........ H04N 7/12; H04N 11/02; H04N 21/431; H04N 21/236; H04N 21/854;
(Continued)

(56) References Cited

U.S. PATENT DOCUMENTS 6,175,573 B1 * 1/2001 Togo ................ H04N 21/23608
348/441
6,567,409 B1 * 5/2003 Tozaki ................ H04N 21/238
370/395.64
(Continued)

FOREIGN PATENT DOCUMENTS

JP 2004-201034 A 7/2004
JP 2008-193203 A 8/2008
(Continued)

OTHER PUBLICATIONS

International Search Report dated Jun. 7, 2016 in PCT/JP2016/061481 filed Apr. 8, 2016.
(Continued)

*Primary Examiner* — Trang U Tran
(74) *Attorney, Agent, or Firm* — Oblon, McClelland, Maier & Neustadt, L.L.P.

(57) ABSTRACT

Subtitle display during variable speed reproduction processing is made to be able to be satisfactorily performed.
A video stream is generated configured by a video packet having encoded image data in a payload. A subtitle stream is generated configured by a subtitle packet that has subtitle information in a payload and in which subtitle display priority information according to the subtitle information is inserted. A multiplexed stream including the video stream and the subtitle stream is generated and transmitted. In a case where an overlap period occurs in display periods of a plurality of subtitles in a variable speed reproduction mode (in a case of N times speed (N>1)), selection of which subtitle to be displayed is facilitated by referring to the priority information, and satisfactory subtitle display reflecting an intention of the production side becomes possible.

10 Claims, 17 Drawing Sheets

(51) Int. Cl.
  *H04N 21/431* (2011.01)
  *H04N 21/236* (2011.01)
  *H04N 21/854* (2011.01)
  *H04N 21/2362* (2011.01)
  *H04N 21/434* (2011.01)
  *H04N 21/4402* (2011.01)
  *H04N 21/488* (2011.01)
  *H04N 21/422* (2011.01)

(52) U.S. Cl.
  CPC ... *H04N 21/23614* (2013.01); *H04N 21/4348* (2013.01); *H04N 21/440281* (2013.01); *H04N 21/4884* (2013.01); *H04N 21/854* (2013.01); *H04N 21/4221* (2013.01)

(58) Field of Classification Search
  CPC ........ H04N 21/4221; H04N 5/93; H04N 5/92; H04N 5/76; H04N 7/00; H04N 11/00
  USPC ........ 348/468, 723, 563, 564; 386/239, 240, 386/243
  See application file for complete search history.

(56) References Cited

U.S. PATENT DOCUMENTS

| | | | |
|---|---|---|---|
| 2004/0237123 A1* | 11/2004 | Park | H04N 5/4401 725/136 |
| 2005/0207737 A1 | 9/2005 | Seo et al. | |
| 2006/0170819 A1 | 8/2006 | Lim et al. | |
| 2008/0260046 A1 | 10/2008 | Zhang et al. | |
| 2011/0310224 A1 | 12/2011 | Lee et al. | |

FOREIGN PATENT DOCUMENTS

| | | |
|---|---|---|
| JP | 2010-81149 A | 4/2010 |
| JP | 2012-169885 A | 9/2012 |

OTHER PUBLICATIONS

Extended European Search Report dated Jul. 26, 2018 in Patent Application No. 16779978.2 , citing documents AA and AO therein, 9 pages.

* cited by examiner

FIG. 3

TTML STRUCTURE

```
<tt xml:lang="" xmlns="http://www.w3.org/ns/ttml">
  <head>
    <metadata/>
    <styling/>
    <layout/>
  </head>
  <body/>
</tt>
```

FIG. 4

(a) TTML Metadata (TTM)

```
<metadata xmlns:ttm="http://www.w3.org/ns/ttml#metadata">
    <ttm:title>Timed Text TTML Example</ttm:title>
    <ttm:copyright>The Authors (c) 2006</ttm:copyright>
</metadata>
```

(b) TTML Styling (TTS)

```
<styling xmlns:tts="http://www.w3.org/ns/ttml#styling">
    <!-- s1 specifies default color, font, and text alignment -->
    <style xml:id="s1"
        tts:color="white"
        tts:fontFamily="proportionalSansSerif"
        tts:fontSize="22px"
        tts:textAlign="center"
    />
    <!-- alternative using yellow text but otherwise the same as style s1 -->
    <style xml:id="s2" style="s1" tts:color="yellow"/>
    <!-- a style based on s1 but justified to the right -->
    <style xml:id="s1Right" style="s1" tts:textAlign="end" />
    <!-- a style based on s2 but justified to the left -->
    <style xml:id="s2Left" style="s2" tts:textAlign="start" />
</styling>
```

(c) TTML Layout ( region )

```
<layout xmlns:tts="http://www.w3.org/ns/ttml#styling">
    <region xml:id="subtitleArea"
        style="s1"
        tts:extent="560px 62px"
        tts:padding="5px 3px"
        tts:backgroundColor="black"
        tts:displayAlign="after"
    />
</layout>
```

TTML Body

```
<body region="subtitleArea">
    <div>
        <p xml:id="subtitle1" begin="0.76s" end="3.45s">
        It seems a paradox, does it not,
        </p>
        <p xml:id="subtitle2" begin="5.0s" end="10.0s">
        that the image formed on<br/>
        the Retina should be inverted?
        </p>
        <p xml:id="subtitle3" begin="10.0s" end="16.0s" style="s2">
        It is puzzling, why is it<br/>
        we do not see things upside-down?
        </p>
    </div>
</body>
```

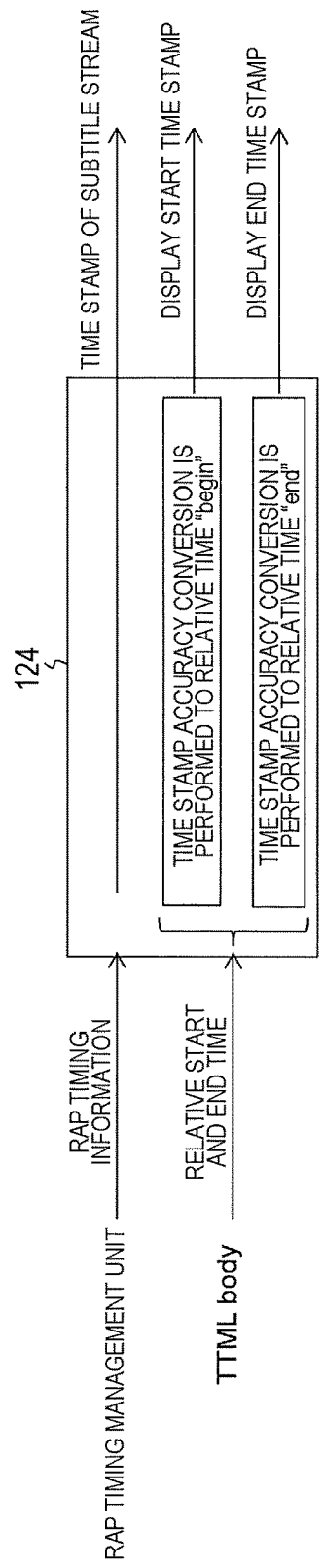

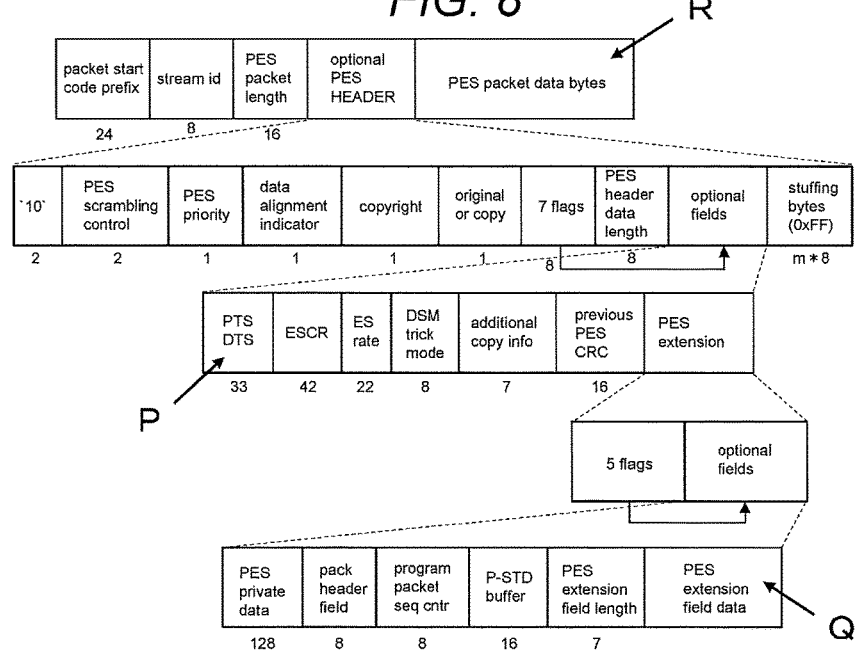

| Syntax | Size | Type |
|---|---|---|
| if ( PES_extension_flag == '1') { | | |
|    PES_private_data_flag  (== "0") | 1 | bslbf |
|    pack_header_field_flag | 1 | bslbf |
|    program_packet_sequence_counter_flag | 1 | bslbf |
|    P-STD_buffer_flag | 1 | bslbf |
|    PES_extension_negflag_new | 1 | bslbf |
|    reserved | 2 | bslbf |
|    PES_extension_flag_2  ( == "1" ) | 1 | bslbf |
|    if ( PES_extension_flag_2 == '1') { | | |
|       marker_bit | 1 | bslbf |
|       PES_extension_field_length  (== "12" ) | 7 | uimsbf |
|       stream_id_extension_flag  (== '1' ) | 1 | bslbf |
|       reserved | 6 | bslbf |
|       tref_extension_flag  (=> '1' ) | 1 | bslbf |
| -- CONTINUED ON NEXT PAGE | | |

FIG. 10

| Syntax | Size | Type |
|---|---|---|
| CONTINUED FROM PREVIOUS PAGE – – | | |
| if (!PES_extension_negflag_new ) { | | |
| extension_type | 8 | bslbf |
| if ( extension_type == "1" ) { | | |
| reserved | 4 | bslbf |
| subtitle_start_time[32..30] | 3 | bslbf |
| marker_bit | 1 | bslbf |
| subtitle_start_time [29..15] | 15 | Bslbf |
| marker_bit | 1 | bslbf |
| subtitle_start_time [14..0] | 15 | bslbf |
| marker_bit | 1 | bslbf |
| reserved | 4 | bslbf |
| subtitle_end_time [32..30] | 3 | bslbf |
| marker_bit | 1 | bslbf |
| subtitle_end_time [29..15] | 15 | bslbf |
| marker_bit | 1 | bslbf |
| subtitle_end_time [14..0] | 15 | bslbf |
| marker_bit | 1 | bslbf |
| } | | |
| else if ( extension_type == "2" ) { | | |
| priority | 8 | uimsbf |
| } | | |
| else if ( extension_type == "3" ) { | | |
| reserved | 4 | bslbf |
| subtitle_start_time[32..30] | 3 | bslbf |
| – – CONTINUED ON NEXT PAGE | | |

FIG. 11

| Syntax | Size | Type |
|---|---|---|
| CONTINUED FROM PREVIOUS PAGE - - | | |
| marker_bit | 1 | bslbf |
| subtitle_start_time [29..15] | 15 | bslbf |
| marker_bit | 1 | bslbf |
| subtitle_start_time [14..0] | 15 | bslbf |
| marker_bit | 1 | bslbf |
| reserved | 4 | bslbf |
| subtitle_end_time [32..30] | 3 | bslbf |
| marker_bit | 1 | bslbf |
| subtitle_end_time [29..15] | 15 | bslbf |
| marker_bit | 1 | bslbf |
| subtitle_end_time [14..0] | 15 | bslbf |
| marker_bit | 1 | bslbf |
| priority | 8 | uimsbf |
| } | | |
| } | | |
| for (i = 0; i < N3; i++) { | | |
| reserved | | |
| } | | |
| } | | |
| } | | |

FIG. 12

PES private data space (stream_id = 0xbd) Syntax

| Syntax | Size | Type |
|---|---|---|
| PES_payload () { | | |
|     private_type | 8 | bslbf |
|     payload_length | 16 | uimsbf |
|     timestamp_insertion_flag | 1 | bslbf |
|     subtitle_priority_insertion_flag | 1 | bslbf |
|     reserved | 6 | bslbf |
|     if (timestamp_insertion_flag) { | | |
|         reserved | 4 | bslbf |
|         subtitle_start_time[32..30] | 3 | bslbf |
|         marker_bit | 1 | bslbf |
|         subtitle_start_time [29..15] | 15 | bslbf |
|         marker_bit | 1 | bslbf |
|         subtitle_start_time [14..0] | 15 | bslbf |
|         marker_bit | 1 | bslbf |
|         reserved | 4 | bslbf |
|         subtitle_end_time [32..30] | 3 | bslbf |
|         marker_bit | 1 | bslbf |
|         subtitle_end_time [29..15] | 15 | bslbf |
|         marker_bit | 1 | bslbf |
|         subtitle_end_time [14..0] | 15 | bslbf |
|         marker_bit | 1 | bslbf |
|     } | | |
| -- CONTINUED ON NEXT PAGE | | |

FIG. 13

| Syntax | Size | Type |
|---|---|---|
| CONTINUED FROM PREVIOUS PAGE -- | | |
|     if (subtitle_priority_insertion_flag) { | | |
|         priority | 8 | uimsbf |
|     } | | |
|     coded_data starts ---- | | |
| } | | |

FIG. 14

SEMANTICS OF NEW ELEMENTS

PES_extension_negflag_new (1bit)   PES   INDICATE THAT NEWLY DEFINED DATA IS ARRANGED IN PES header EXTENDED AREA.
 "0"   PES   NEWLY DEFINED DATA IS ARRANGED IN PES header EXTENDED AREA
 "1"   PES   NEWLY DEFINED DATA IS NOT ARRANGED IN PES header EXTENDED AREA extension_type (8bits)  INDICATE TYPE OF NEWLY DEFINED DATA.
 "1"   TIME STAMPS REPRESENTING SUBTITLE DISPLAY START AND END ARE ARRANGED
 "2"   SUBTITLE DISPLAY PRIORITY INFORMATION IS ARRANGED
 "3"   DISPLAY PRIORITY INFORMATION IS ARRANGED TOGETHER WITH TIME STAMPS REPRESENTING SUBTITLE DISPLAY START AND END
 others   reserved priority (8bits)   INDICATE DISPLAY PRIORITY
 "0"   BEING ABSOLUTELY DISPLAYED IS MEANT IN CASE OF SUBTITLE DISPLAY MODE
 "1"   DISPLAY PRIORITY IS THE HIGHEST (EXCEPT FOR "0")
 ...
 "255"   DISPLAY PRIORITY IS THE LOWEST private_type (8bts)   INDICATE TYPE OF PRIVATE PES PACKET.
 "EC"   INDICATE THAT IT IS SUBTITLE STREAM WITH TIME STAMP, DISPLAY PRIORITY timestamp_insertion_flag (1bit)   INDICATE THAT TIME STAMP IS ARRANGED AT BEGINNING OF THE PACKET PAYLOAD.
 "1"   TIME STAMP IS ARRANGED
 "0"   TIME STAMP IS NOT ARRANGED subtitle_priority_insertion_flag (1bit)   INDICATE THAT SUBTITLE DISPLAY PRIORITY INFORMATION IS ARRANGED AT BEGINNING OF THE PACKET PAYLOAD.
 "1"   SUBTITLE DISPLAY PRIORITY INFORMATION IS ARRANGED
 "0"   SUBTITLE DISPLAY PRIORITY INFORMATION IS NOT ARRANGED subtitle_start_time (33bits)   VALUE REPRESENTING SUBTITLE DISPLAY START TIME WITH SYSTEM CLOCK ACCURACY.

subtitle_end_time (33bits)   VALUE REPRESENTING SUBTITLE DISPLAY END TIME WITH SYSTEM CLOCK ACCURACY.

| Syntax | Size | Type |
|---|---|---|
| Subtitle_rap_descriptor() { | | |
|   descriptor_tag | 8 | uimsbf |
|   descriptor_length | 8 | uimsbf |
|   subtitle_presentation_time_flag | 1 | bslbf |
|   priority_information_flag | 1 | bslbf |
|   if ( subtitle_presentation_time_flag\|priority_information_flag ) { | | |
|     time_insertion_type | 2 | bslbf |
|     reserved | 5 | 0x1f |
|   }else{ | | |
|     reserved | 7 | 0x7f |
|   } | | |
| } | | |

(b)

subtitle_presentation_time_flag (1bit)  INDICATE WHETHER OR NOT SUBTITLE ORIGINAL DISPLAY TIME STAMP EXISTS.
  "0"  SUBTITLE ORIGINAL DISPLAY TIME STAMP DOES NOT EXIST
  "1"  SUBTITLE ORIGINAL DISPLAY TIME STAMP EXISTS priority_information_flag (1bit)  INDICATE WHETHER OR NOT SUBTITLE DISPLAY PRIORITY INFORMATION EXITS.
  "0"  SUBTITLE DISPLAY PRIORITY INFORMATION DOES NOT EXIST
  "1"  SUBTITLE DISPLAY PRIORITY INFORMATION EXISTS time_insertion_type (2bits)  INDICATE INSERTION TYPE OF SUBTITLE ORIGINAL DISPLAY TIME STAMP.
  "01"  INDICATE INSERTION INTO PES header extension PORTION
  "10"  INDICATE INSERTION INTO PES payload

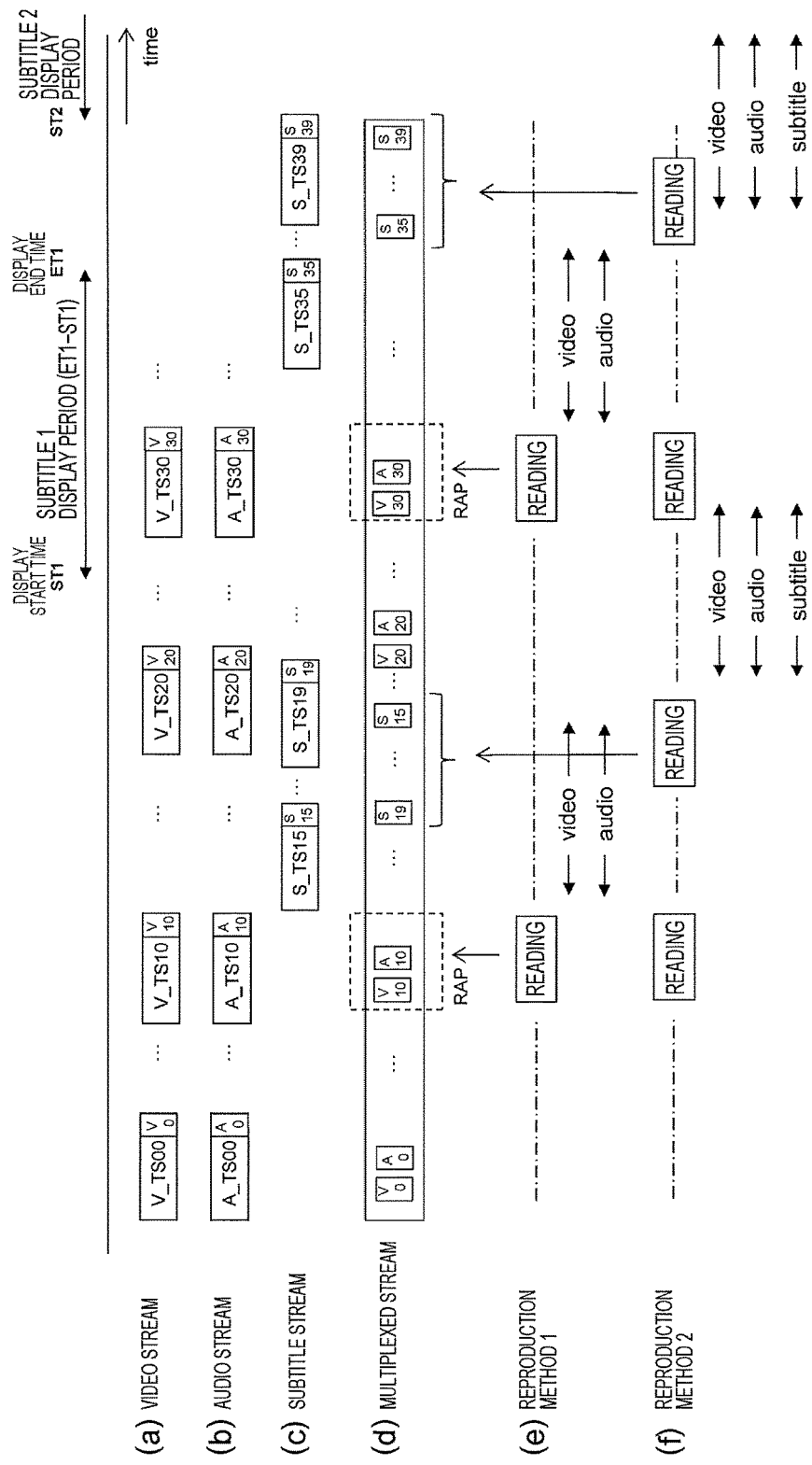

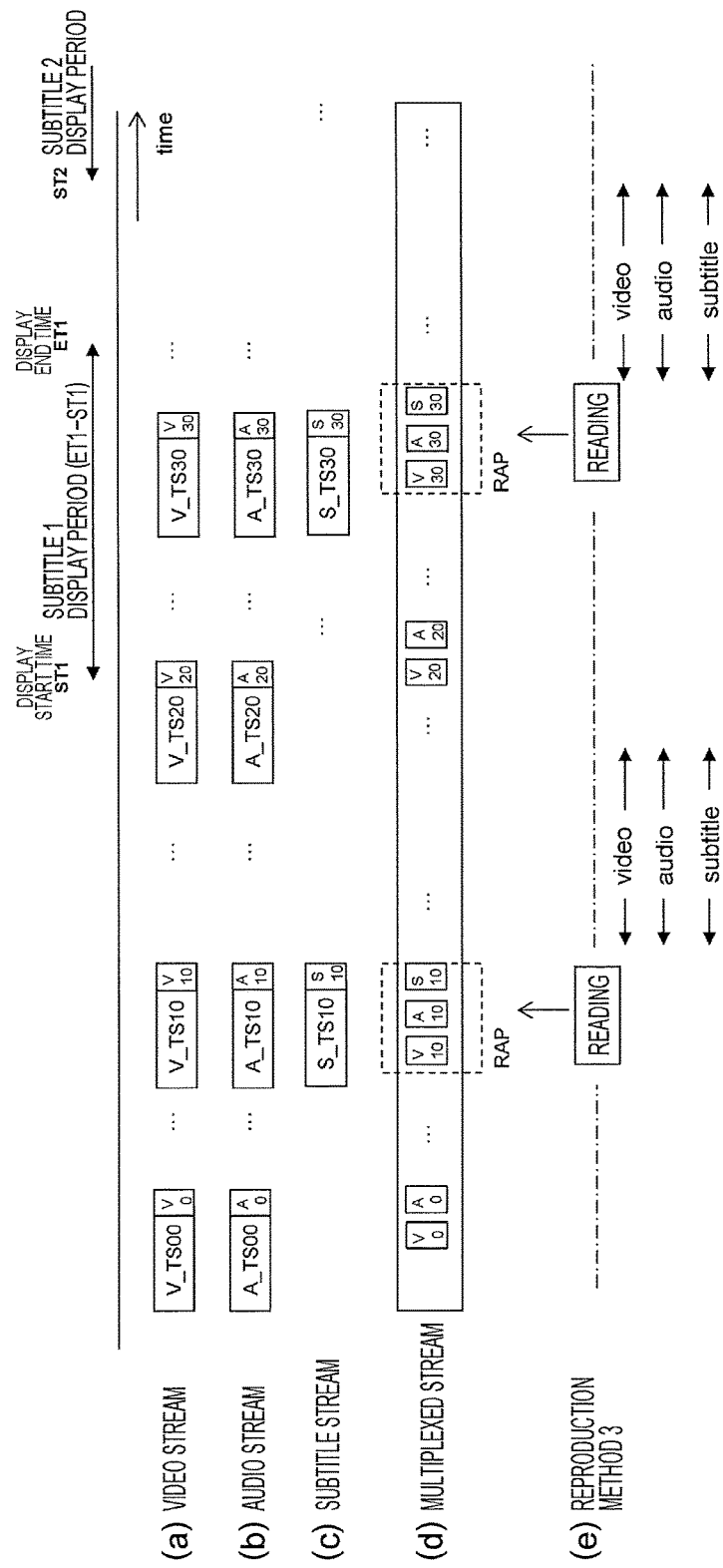

US 10,225,600 B2

TRANSMISSION DEVICE, TRANSMISSION METHOD, REPRODUCTION DEVICE AND REPRODUCTION METHOD

TECHNICAL FIELD

The present technology relates to a transmission device, a transmission method, a reproduction device, and a reproduction method, and in particular relates to a transmission device and the like that transmit subtitle information together with image data.

BACKGROUND ART

Conventionally, for example, in a broadcasting of digital video broadcasting (DVB), operation of transmitting subtitle information as bitmap data has been performed. Recently, it has been devised to transmit the subtitle information as text character codes, that is, text-based transmission. In this case, font development according to resolution is performed in the receiving side.

In addition, it has been devised to cause text information to have timing information in a case of the text-based transmission of the subtitle information. As the text information, for example, Timed Text Markup Language (TTML) has been advocated by the World Wide Web Consortium (W3C) (see Patent document 1).

CITATION LIST

Patent Document

Patent document 1: Japanese Patent Application Laid-Open No. 2012-169885

SUMMARY OF THE INVENTION

Problems to be Solved by the Invention

An object of the present technology is to make it possible to satisfactorily perform subtitle display during variable speed reproduction processing.

Solutions to Problems

A concept of the present technology is a transmission device including:

a video encoding unit that generates a video stream configured by a video packet having encoded image data in a payload;

a subtitle encoding unit that generates a subtitle stream configured by a subtitle packet that has subtitle information in a payload and in which subtitle display priority information according to the subtitle information is inserted;

a multiplexed stream generation unit that generates a multiplexed stream including the video stream and the subtitle stream; and a transmission unit that transmits the multiplexed stream.

In the present technology, the video stream configured by the video packet having the encoded image data in the payload is generated by the video encoding unit. The subtitle stream configured by the subtitle packet that has the subtitle information in the payload and in which the subtitle display priority information according to the subtitle information is inserted is generated by the subtitle encoding unit.

For example, the subtitle information may be text information of a subtitle of a predetermined format having display timing information. For example, the subtitle encoding unit may insert the priority information in the header or the payload of the subtitle packet.

The multiplexed stream including the video stream and the subtitle stream is generated by the multiplexed stream generation unit. For example, the video packet and the subtitle packet may be PES packets, and the multiplexed stream may be an MPEG2 transport stream. The multiplexed stream is transmitted by the transmission unit.

As described above, in the present technology, the subtitle display priority information according to the subtitle information included in the subtitle packet is inserted in the subtitle packet. For that reason, in a case where an overlap period occurs in display periods of a plurality of subtitles during variable speed reproduction processing, selection of which subtitle to be displayed can be facilitated by referring to the priority information, and satisfactory subtitle display reflecting an intention of the production side becomes possible.

Incidentally, in the present technology, for example, the multiplexed stream generation unit may insert identification information indicating that the priority information is inserted in the subtitle packet, in the multiplexed stream. In this case, for example, information indicating an insertion position may be added to the identification information. By inserting the identification information, it can be easily determined that the priority information is inserted in the subtitle packet. In addition, by adding the information indicating the insertion position, the priority information can be easily acquired from the subtitle packet.

In addition, in the present technology, for example, the multiplexed stream generation unit may arrange the subtitle packet at a random access position. In this case, the subtitle packet can be taken out together when the video packet at the random access position is taken out from the multiplexed stream, and subtitle display processing during the variable speed reproduction can be simplified.

In addition, another concept of the present technology is a reproduction device including:

a variable speed reproduction processing unit that performs variable speed reproduction processing to a multiplexed stream including a subtitle stream configured by a video stream configured by a video packet having encoded image data in a payload, and a subtitle packet that has subtitle information in a payload and in which subtitle display priority information according to the subtitle information is inserted; and a subtitle display control unit that controls display of a subtitle according to subtitle information included in each subtitle packet on the basis of the priority information when variable speed reproduction processing is performed to the multiplexed stream by the variable speed reproduction processing unit.

In the present technology, variable speed reproduction processing is performed to the multiplexed stream including the video stream and the subtitle stream by the variable speed reproduction processing unit. Here, the video stream is configured by the video packet having the encoded image data in the payload. In addition, the subtitle stream is configured by the subtitle packet that has the subtitle information in the payload and in which the subtitle display priority information according to the subtitle information is inserted.

When variable speed reproduction processing is performed to the multiplexed stream by the variable speed reproduction processing unit, display of the subtitle according to the subtitle information included in each subtitle packet is controlled on the basis of the priority information, by the subtitle display control unit. For example, the display control unit, when an overlap period occurs in a display period of the subtitle according to a plurality of pieces of subtitle information, may perform control such that only a subtitle with the highest priority is displayed.

As described above, in the present technology, when variable speed reproduction processing is performed to the multiplexed stream, display of the subtitle according to the subtitle information included in each subtitle packet is controlled on the basis of the priority information. For that reason, in the case where the overlap period occurs in the display periods of the plurality of subtitles during variable speed reproduction processing, selection of which subtitle to be displayed can be facilitated, and satisfactory subtitle display reflecting an intention of the production side becomes possible.

Effects of the Invention

With the present technology, subtitle display during variable speed reproduction processing can be satisfactorily performed. Incidentally, the advantageous effects described in this specification are merely examples, and the advantageous effects of the present technology are not limited to them and may include additional effects.

BRIEF DESCRIPTION OF DRAWINGS

FIG. 3 is a diagram for explaining a TTML structure.

FIGS. 4(a) to 4(c) are diagrams respectively showing example structures of elements of metadata (metadata), styling (styling), and layout (layout) existing in the header (head) of the TTML structure.

FIG. 7 is a diagram for explaining a detailed configuration of a subtitle display timing management unit.

FIG. 8 is a diagram showing an example configuration of a PES packet.

FIG. 9 is a diagram showing an example configuration (1/3) of a PES extension "PES extension".

FIG. 10 is a diagram showing an example configuration (2/3) of the PES extension "PES extension".

FIG. 11 is a diagram showing an example configuration (3/3) of the PES extension "PES extension".

FIG. 12 is a diagram showing an example configuration (1/2) of a PES payload (PES_payload) arranged in an area of "PES packet data bytes".

FIG. 13 is a diagram showing an example configuration of (2/2) of the PES payload (PES_payload) arranged in the area of the "PES packet data bytes".

FIG. 14 is a diagram showing contents of new elements in the example configurations of the PES extension and the PES payload.

FIGS. 15(a) and 15(b) are diagrams respectively showing an example structure of a subtitle rap descriptor and contents of main information in the example structure.

FIGS. 21(a) to 21(f) are diagrams for explaining conventional multiplexing.

FIGS. 22(a) to 22(e) are diagrams for explaining multiplexing of the present technology.

MODES FOR CARRYING OUT THE INVENTION

The following is a description of a mode for carrying out the invention (the mode will be hereinafter referred to as the "embodiment"). Incidentally, explanation will be made in the following order.
1. Embodiment
2. Modifications 1. Embodiment

[Example Configuration of Transmission/Reception System]

Figure 1:
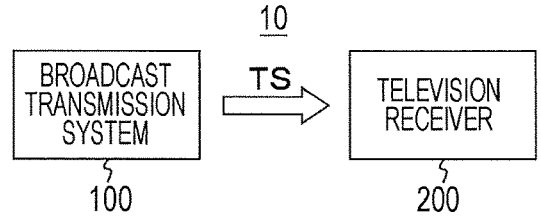
FIG. 1 is a block diagram showing an example configuration of a transmission/reception system as an embodiment.

FIG. 1 shows an example configuration of a transmission/reception system 10 as an embodiment. The transmission/reception system 10 is configured by a broadcast transmission system 100 and a television receiver 200. The broadcast transmission system 100 transmits a transport stream TS as a multiplexed stream by loading the transport stream TS on a broadcast wave. The transport stream TS includes a video stream and a subtitle stream. Incidentally, the transport stream TS may include an audio stream. The video stream is configured by a video PES packet having image data in the payload. The subtitle stream is configured by a subtitle PES packet having subtitle information in the payload.

A time stamp is inserted of a value equal to or close to a time stamp inserted in a time stamp insertion position of the header of the video PES packet at a random access position, in a time stamp insertion position of the header of the subtitle PES packet. In addition, in the header or the payload of the subtitle PES packet, an original time stamp indicating display time of a subtitle is inserted, and subtitle display priority information according to subtitle information is inserted.

When the subtitle stream is multiplexed with the video stream and the like, a TS packet including the subtitle PES packet (hereinafter, simply referred to as a PES packet) is arranged at the random access position. In this case, for example, as described above, the time stamp inserted in the time stamp insertion position of the header is referred to, and the subtitle PES packet is arranged at the random access position, that is, a position close to a position of the video PES packet of the random access position.

In the transport stream TS, identification information is inserted indicating that the original time stamp is inserted, and the subtitle display priority information is inserted, in the subtitle PES packet. The identification information is inserted under a program map table, for example. As described above, in the subtitle PES packet, the original time stamp is inserted, and the subtitle display priority information according to the subtitle information is inserted, in the header or the payload. Information indicating the insertion position is added to the identification information.

The television receiver 200 receives the transport stream TS transmitted by the broadcast wave from the broadcast transmission system 100. The transport stream TS includes at least the video stream and the subtitle stream, as described above. The video stream is configured by a video PES packet having image data in the payload.

The subtitle stream is configured by the subtitle PES packet that has the subtitle information in the payload and in which the original time stamp indicating the display time of the subtitle is inserted and the subtitle display priority information according to the subtitle information is inserted. In addition, in multiplexing of the transport stream TS, the subtitle PES packet is arranged at the random access position.

The television receiver 200 takes out the subtitle PES packet from the transport stream TS together with the video PES packet at the random access position, and performs subtitle display processing. For example, in a variable speed reproduction mode, the subtitle PES packet taken out from the random access position of the transport stream TS is immediately processed, and the subtitle is displayed.

In addition, in the variable speed reproduction mode, in a case of N times speed (N>1), an overlap period may occur in display periods of a plurality of subtitles. In a case where the overlap period occurs in the display periods of the plurality of subtitles, the television receiver 200 controls selection of which subtitle to be displayed, on the basis of the subtitle display priority information. For example, control is performed such that only a subtitle with the highest priority is displayed. In this case, the television receiver 200 extracts the subtitle display priority information from the subtitle PES packet on the basis of the identification information inserted in the transport stream TS, and uses the priority information.

In addition, for example, in a normal reproduction mode, the television receiver 200 processes the subtitle PES packet taken out from the random access position of the transport stream TS on the basis of the original time stamp indicating the display time of the subtitle, and displays the subtitle at the display time. In this case, the television receiver 200 extracts the original time stamp from the subtitle PES packet on the basis of the identification information inserted in the transport stream TS, and uses the original time stamp.

[Example Configuration of Stream Generation Unit of Broadcast Transmission System]

Figure 2:
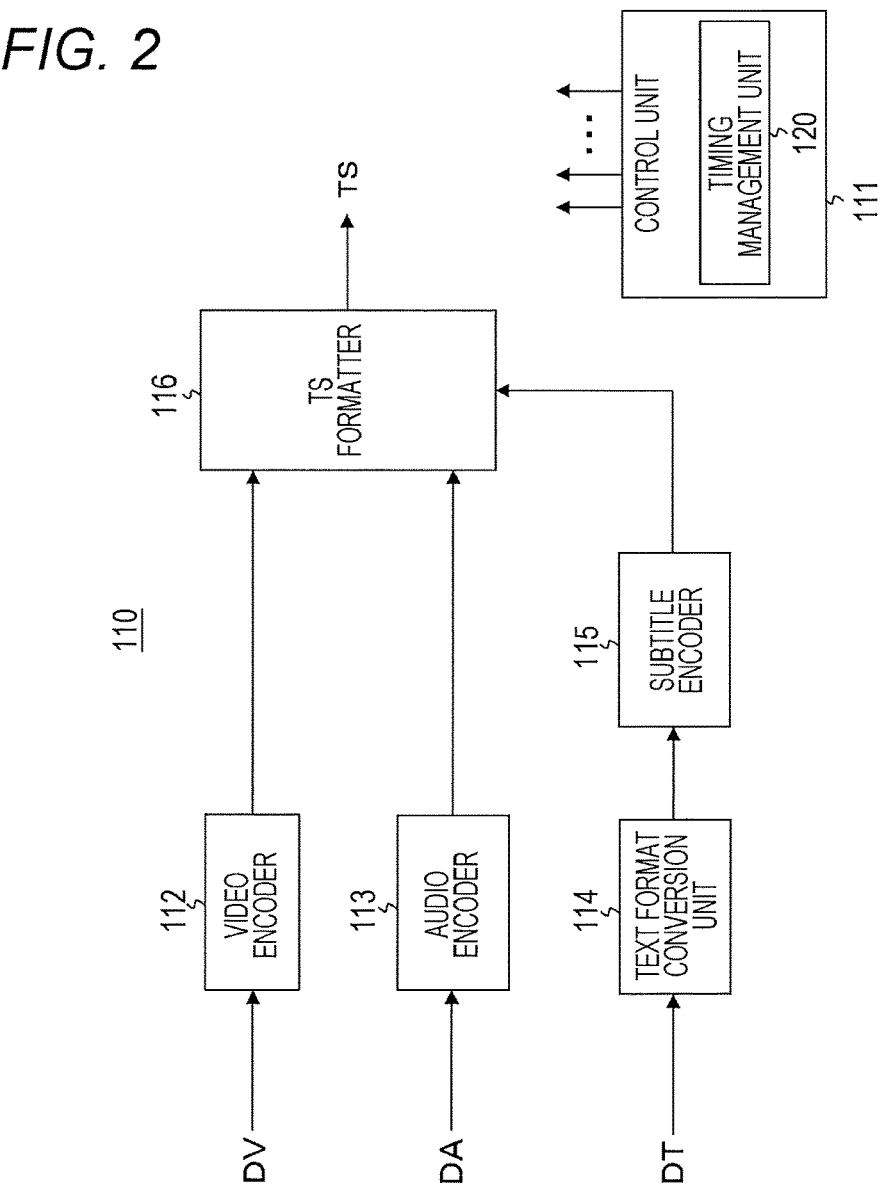
FIG. 2 is a block diagram showing an example configuration of a stream generation unit of a broadcast transmission system.

FIG. 2 shows an example configuration of a stream generation unit 110 of the broadcast transmission system 100. The stream generation unit 110 includes a control unit 111, a video encoder 112, an audio encoder 113, a text format conversion unit 114, a subtitle encoder 115, and a TS formatter (multiplexer) 116.

The control unit 111 is made to have a configuration including, for example, a Central Processing Unit (CPU), and controls operation of each unit of the stream generation unit 110. The video encoder 112 inputs image data DV, and performs encoding to the image data DV, to generate a video stream (PES stream) configured by a video PES packet having encoded image data in the payload. The audio encoder 113 inputs audio data DA, and performs encoding to the audio data DA, to generate an audio stream (PES stream) configured by an audio PES packet having encoded audio data.

The text format conversion unit 114 inputs text data (character code) DT as the subtitle information to obtain text information of a subtitle of a predetermined format having display timing information. As the text information, for example, TTML or a derived format of TTML can be considered; however, in this embodiment, it is assumed to be TTML.

FIG. 3 shows a TTML structure. TTML is described on an XML basis. Each of elements of metadata (metadata), styling (styling), and layout (layout) exists in the header (head). FIG. 4(*a*) shows an example structure of metadata (TTML Metadata (TTM)). The metadata includes title information of the metadata and copyright information.

FIG. 4(*b*) shows an example structure of styling (TTML Styling (TTS)). The styling includes information such as a color (color), a font (fontFamily), a size (fontSize), and an alignment (textAlign), besides an identifier (id). FIG. 4(*c*) shows an example structure of layout (TTML layout (region)). The layout includes information such as a range (extent), an offset (padding), a background color (backgroundColor), and an alignment (displayAlign), besides an identifier (id) of a region in which the subtitle is arranged.

Figures 5, 6:
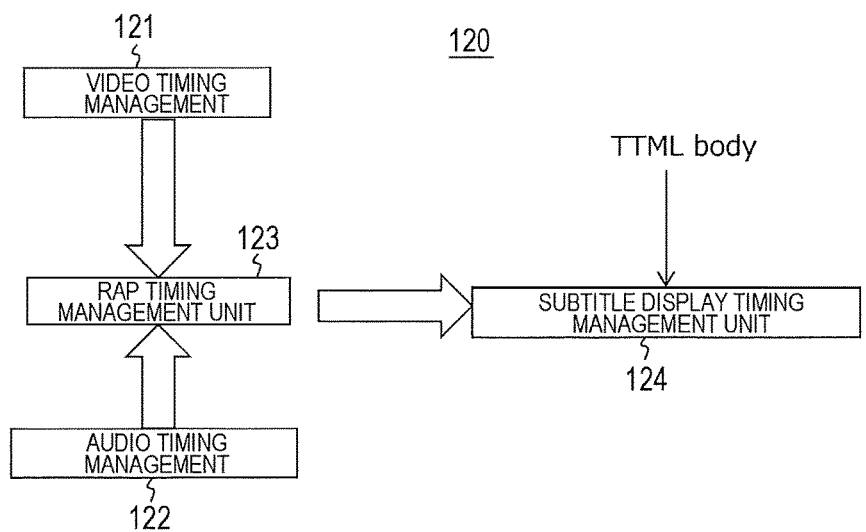
FIG. 5 is a diagram showing an example structure of a body (body) of the TTML structure.
FIG. 6 is a diagram schematically showing an example configuration of a timing management unit in a control unit.

FIG. 5 shows an example structure of a body (body). In the shown example, three pieces of subtitle information, subtitle 1 (subtitle 1), subtitle 2 (subtitle 2), and subtitle 3 (subtitle 3), are included. For each subtitle, display start timing and display end timing are described, and the text data is described. For example, regarding the subtitle 1 (subtitle 1), the display start timing is "0.76 s", the display end timing is "3.45 s", and the text data is "It seems a paradox, dose it not,".

Returning to FIG. 2, the subtitle encoder 115 converts TTML obtained by the text format conversion unit 114 into various segments, and generates a subtitle stream (PES stream) configured by a subtitle PES packet in which those segments (subtitle information) are arranged in the payload.

Under the control of the control unit 111, the subtitle encoder 115 inserts a time stamp (first time stamp) of a value equal to or close to a time stamp inserted in a time stamp insertion position of the header of the video PES packet at the random access position, that is, the video PES packet being a RandomAccess Point (RAP) target, in the time stamp insertion position of the header of the subtitle PES packet.

Here, it is meant that a head portion of a RAP target video PES packet is, for example, a head portion of the video PES packet having encoded image data of an intra picture (I picture) in the payload. In so-called RAP reproduction, only encoded image data of the intra picture included in the RAP target video PES packet is decoded from the transport stream TS, and image display is performed. In addition, in another variable speed reproduction, encoded image data is decoded of a picture included in some intermittent video PES packets according to multiplied speed including the RAP target video PES packet, and image display is performed.

In addition, under the control of the control unit 111, the subtitle encoder 115 inserts an original time stamp (second time stamp) indicating the display time (display start time, display end time) of the subtitle, and inserts the subtitle display priority information according to the subtitle information, in the header or the payload of the subtitle PES packet.

FIG. 6 schematically shows an example configuration of a timing management unit 120 in the control unit 111. The timing management unit 120 includes a video timing management unit 121, an audio timing management unit 122, a RAP timing management unit 123, and a subtitle display timing management unit 124.

The video timing management unit 121 manages a time stamp (a time stamp of a video access unit) to be inserted in the time stamp insertion position of each video PES packet. In the video encoder 112, on the basis of management information of the video timing management unit 121, the time stamp is inserted in the time stamp insertion position of each video PES packet.

The audio timing management unit 122 manages a time stamp (a time stamp of an audio access unit) to be inserted in the time stamp insertion position of each audio PES packet. In the audio encoder 113, on the basis of management information of the audio timing management unit 122, the time stamp is inserted in the time stamp insertion position of each audio PES packet.

The RAP timing management unit 123 manages the time stamp of the RAP target video PES packet, and manages the audio PES packet to be the RAP target among the audio PES packets. In this case, an audio PES packet having a time stamp close to the time stamp of the RAP target video PES packet is treated as a reproduction target in a case of RAP. On the basis of management information on the audio PES packet to be the RAP target, in the TS formatter 116, as described later, the audio PES packet to be the RAP target is arranged at the random access position, that is, a position close to the position of the RAP target video PES packet.

The subtitle display timing management unit 124 manages the first time stamp (the time stamp inserted in a time stamp insertion area of the header) and the second time stamp (the original time stamp indicating the display time of the subtitle inserted in the header or the payload) of the subtitle PES packet. In the subtitle encoder 115, on the basis of the management information of the subtitle display timing management unit 124, the first time stamp and the second time stamp are inserted in the subtitle PES packet.

FIG. 7 shows a detailed configuration of the subtitle display timing management unit 124. The subtitle display timing management unit 124 obtains the first time stamp (the time stamp of the subtitle stream) on the basis of RAP timing information from the RAP timing management unit 123. In addition, the subtitle display timing management unit 124 performs time stamp accuracy conversion to a relative start time "begin" and a relative end time "end" included in a TTML body, and obtains the second time stamp (display start time stamp, display end time stamp).

Incidentally, as shown in FIG. 5, in a case where display timing varies in a plurality of regions (regions), time stamp accuracy conversion is performed to the relative start time "begin" and the relative end time "end" of a region with the earliest timing, and the display start time stamp and the display end time stamp as the second time stamps are obtained.

In this case, in the receiving side, regarding display control in the earliest region, the display start time stamp and the display end time stamp as the second time stamps are used. In addition, regarding display control of the subsequent regions, a display time stamp (display start time stamp, display end time stamp) subjected to time stamp accuracy conversion on the basis of a difference from the relative time of the earliest region supplied by the TTML body, is generated and used.

"Insertion position of second time stamp (subtitle original display time stamp) and subtitle display priority information"

Here, a specific example is described of the insertion position of the second time stamp (subtitle original display time stamp) and the subtitle priority information. FIG. 8 shows an example configuration (Syntax) of the PES packet. The first time stamp is inserted in a 33-bit area being the time stamp insertion area of the header indicated by an arrow P. The time stamp insertion area exists in "optional fields" under "optional PES HEADER" configuring the header.

The second time stamp and the subtitle priority information are inserted in the header or the payload, as described above. In a case of being inserted in the header, they are inserted in, for example, an area of "PES extension fields data" indicated by an arrow Q. The "PES extension fields data" exists in "optional fields" under "PES extension". Incidentally, the "PES extension" exists in "optional fields" under the "optional PES HEADER" configuring the header. On the other hand, in a case of being inserted in the payload, the second time stamp and the subtitle priority information are inserted in an area of "PES packet data bytes" indicated by an arrow R.

FIGS. 9 to 11 show an example configuration (Syntax) of the "PES extension". FIGS. 12 and 13 show an example configuration (Syntax) of a PES payload (PES_payload) arranged in the area of the "PES packet data bytes". FIG. 14 shows contents (Semantics) of new elements in each example configuration.

First, an example configuration is described of the PES extension (PES extension) shown in FIGS. 9 to 11. As flag information, flag information of "PES_extension_negflag_new" is newly defined. The flag information indicates that newly defined data is arranged in a PES header extended area (PES extension). "0" indicates that the newly defined data is arranged in the PES header extended area. "1" indicates that the newly defined data is not arranged in the PES header extended area.

When the "PES_extension_negflag_new" is "0", an 8-bit field of "extension_type" exists. The field indicates a type of the newly defined data. "1" indicates that the time stamps representing subtitle display start and end (subtitle original display time stamps) are arranged. "2" indicates that the subtitle display priority information is arranged. "3" indicates that the subtitle display priority information is arranged together with the time stamps representing display start and end of the subtitle.

When the "extension_type" is "1", a 33-bit field of "subtitle_start_time" and a 33-bit field of "subtitle_end_time" exist. The "subtitle_start_time" indicates a value representing subtitle display start time (display start time stamp) with system clock accuracy. The "subtitle_end_time" indicates a value representing the end time of subtitle display (display end time stamp) with system clock accuracy.

When the "extension_type" is "2", an 8-bit field of "priority" exists. The "priority" indicates display priority of the subtitle. "0" means that the subtitle is absolutely displayed in a case of a subtitle display mode. "1" has the highest display priority except for "0". Subsequently, as the value increases, the display priority decreases. "255" has the lowest display priority.

When the "extension_type" is "3", the 33-bit field of the "subtitle_start_time" and the 33-bit field of the "subtitle_end_time" exist, and further, the 8-bit field of the "priority" exists.

Next, an example configuration is described of the PES payload (PES_payload) shown in FIGS. 12 and 13. The subtitle PES packet is defined as a private PES packet. In a case of the private PES packet, since the "PES packet data bytes" can be freely defined, the time stamps representing the display start and end, and the subtitle display priority information are inserted in a part of the "PES packet data bytes".

An 8-bit field of "private_type" indicates a type of the private PES packet. "EC" indicates that it is a subtitle stream with the subtitle original display time stamp and the subtitle display priority information. Flag information of "timestamp_insertion_flag" indicates that the time stamp is arranged at the beginning of the packet payload. "1" indicates that the subtitle original display time stamp is arranged. "0" indicates that the subtitle original display time stamp is not arranged. When the "timestamp_insertion_flag" is "1", the 33-bit field of the "subtitle_start_time" and the 33-bit field of the "subtitle_end_time" exist.

Flag information of "subtitle_priority_insertion_flag" indicates that the subtitle display priority information is arranged at the beginning of the packet payload. "1" indicates that the subtitle display priority information is arranged. "0" indicates that the subtitle display priority information is not arranged. When the "subtitle_priority_insertion_flag" is "1", the 8-bit field of the "priority" exists.

Returning to FIG. 2, the TS formatter 116 makes the video stream generated by the video encoder 112, the audio stream generated by the audio encoder 113, and the subtitle stream generated by the subtitle encoder 115 into a transport packet to multiplex them, and obtains the transport stream TS as the multiplexed stream.

When the streams are multiplexed in this way, the TS formatter 116 arranges the subtitle PES packet at the random access position, that is, the position close to the position of the RAP target video PES packet, on the basis of the first time stamp (the time stamp inserted in the time stamp insertion position of the header). In addition, at this time, the TS formatter 116 arranges the audio PES packet to be the RAP target at the random access position, that is, the position close to the position of the RAP target video PES packet, on the basis of the management information on the audio PES packet being the RAP target.

In addition, the TS formatter 116 inserts identification information indicating that the second time stamp (subtitle original display time stamp) and the subtitle display priority information are inserted in the subtitle PES packet, in the transport stream TS. In this embodiment, the TS formatter 116 inserts a subtitle rap descriptor (Subtitle_rap_descriptor) in a subtitle elementary stream loop corresponding to the subtitle stream under the program map table (Program Map Table (PMT)).

FIG. 15(a) shows an example structure (Syntax) of the subtitle rap descriptor. FIG. 15(b) shows contents (Semantics) of main information in the example structure. An 8-bit field of "descriptor_tag" indicates a descriptor type, and here, indicates that it is the subtitle rap descriptor. An 8-bit field of "descriptor_length" indicates the length (size) of the descriptor, and indicates the number of subsequent bytes as the length of the descriptor.

Flag information of "subtitle_presentation_time_flag" indicates whether or not the subtitle original display time stamp exists. "0" indicates that the subtitle original display time stamp does not exist. "1" indicates that the subtitle original display time stamp exists. Flag information of "priority_information_flag" indicates whether or not the subtitle display priority information exists. "0" indicates that the subtitle display priority information does not exist. "1" indicates that the subtitle display priority information exists.

When the "subtitle_presentation_time_flag" is "1", or when the "priority_information_flag" is "1", a 2-bit field of "time_insertion_type" exists. The field indicates an insertion type of the subtitle original display time stamp, that is, where the time stamp is inserted. "01" indicates insertion into a PES header extension (PES header extension) portion. "10" indicates insertion into the payload of a PES private stream (PES private stream payload).

Figure 16:
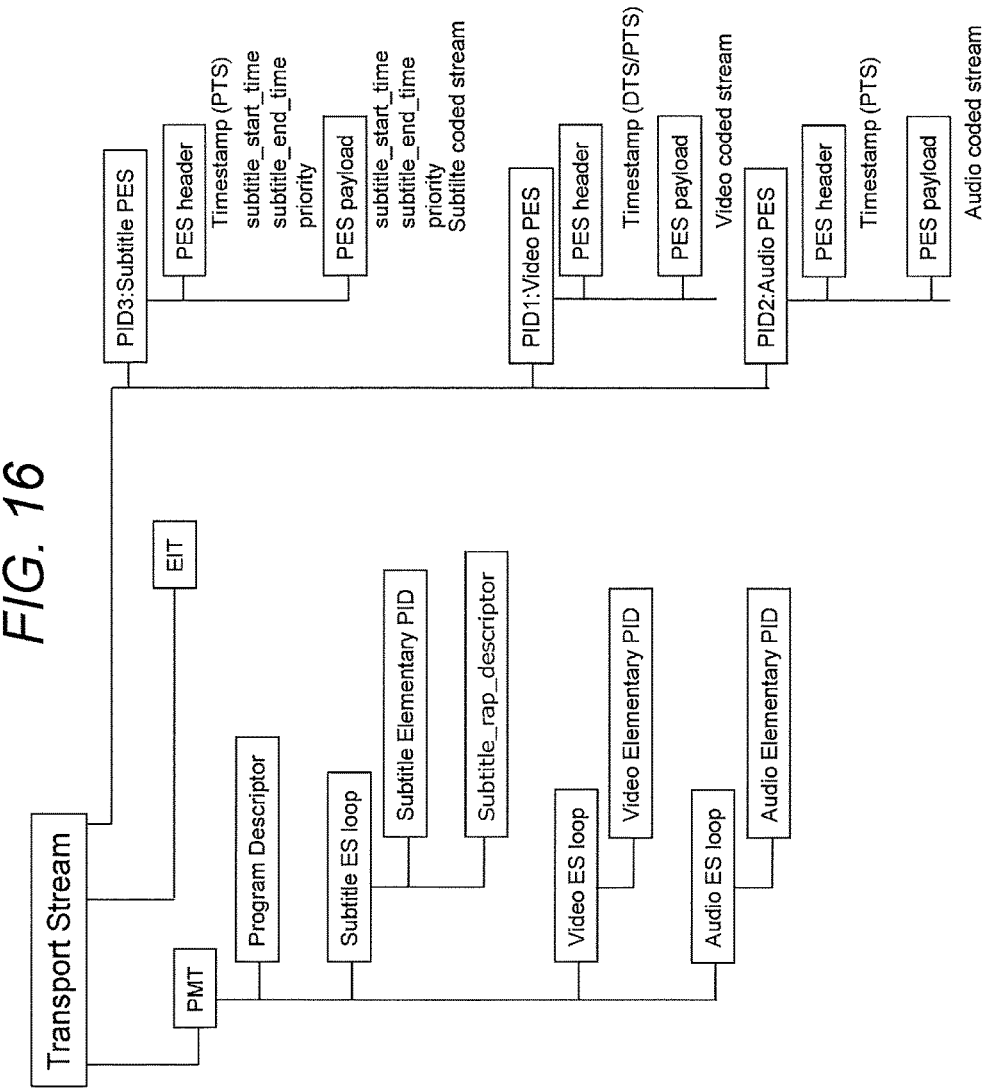
FIG. 16 is a diagram showing an example configuration of a transport stream TS.

FIG. 16 shows an example configuration of the transport stream TS. In the example configuration, a video PES packet "Video PES" exists being a PES packet of a video stream identified by PID1. In addition, in the example configuration, an audio PES packet "Audio PES" exists being a PES packet of an audio stream identified by PID2. In addition, in the example configuration, a subtitle PES packet "Subtitle PES" exists being a PES packet of a subtitle stream identified by PID3.

The PES packet is configured by a PES header (PES header) and a PES payload (PES payload). In the video PES packet, a time stamp of DTS/PTS is inserted in the PES header, and a video encoded stream (encoded image data) is inserted in the PES payload. In addition, in the audio PES packet, a time stamp of PTS is inserted in the PES header, and an audio encoded stream (encoded audio data) is inserted in the PES payload.

In addition, in the subtitle PES packet, a time stamp of PTS (first time stamp) is inserted in the PES header, and a subtitle encoded stream (a plurality of subtitle segments as the subtitle information) is inserted in the PES payload. In addition, in the PES header or the PES payload, the display start time stamp "subtitle_start_time" and the display end time stamp "subtitle_end_time" as the second time stamp (subtitle original display time stamp) exist, and the subtitle display priority information "priority" exists.

In addition, the transport stream TS includes the Program Map Table (PMT) as Program Specific Information (PSI). The PSI is information describing which program each elementary stream included in the transport stream TS belongs to. In addition, in the transport stream TS, the Event Information Table (EIT) is included as Serviced Information (SI) that performs management for each event. In the EIT, metadata for each program is described.

In the PMT, a program descriptor (Program Descriptor) exists describing information related to the entire program. In addition, in the PMT, an elementary stream loop exists having information related to each elementary stream. In the example configuration, a video elementary stream loop (Video ES loop), an audio elementary stream loop (Audio ES loop), and a subtitle elementary stream loop (Subtitle ES loop) exist.

In each loop, information such as a packet identifier (PID) is arranged, and a descriptor describing information related to the elementary stream is also arranged. In the subtitle elementary stream loop, as one of descriptors, the above-described subtitle rap descriptor (Subtitle_rap_descriptor) is arranged. In the subtitle rap descriptor, identification information exists indicating that the second time stamp (subtitle original display time stamp) and the subtitle priority information are inserted in the subtitle PES packet.

Operation of the stream generation unit 110 shown in FIG. 2 is briefly described. The image data DV is supplied to the video encoder 112. In the video encoder 112, encoding is performed to the image data DV, and the video stream (PES stream) is generated configured by the video PES packet having the encoded image data in the payload. The video stream is supplied to the TS formatter 116.

In addition, the audio data DA is supplied to the audio encoder 113. In the audio encoder 113, encoding is performed to the audio data DA, and the audio stream (PES stream) is generated configured by the audio PES packet having the encoded audio data. The audio stream is supplied to the TS formatter 116.

In addition, the text data (character code) DT as the subtitle information is supplied to the text format conversion unit 114. In the text format conversion unit 114, text information of a subtitle of a predetermined format having display timing information, here, TTML, is obtained. The TTML is supplied to the subtitle encoder 115.

In the subtitle encoder 115, the TTML is converted into various segments, and the subtitle stream is generated configured by the subtitle PES packet in which those segments are arranged in the payload. The subtitle stream is supplied to the TS formatter 116.

In the subtitle encoder 115, during generation of the subtitle stream, under the control of the control unit 111, the time stamp (first time stamp) is inserted of a value equal to or close to the time stamp inserted in the time stamp insertion position of the header of the RAP target video PES packet, in the time stamp insertion position of the header of the subtitle PES packet.

In addition, in the subtitle encoder 115, during generation of the subtitle stream, under the control of the control unit 111, the subtitle original display time stamp (second time stamp) indicating the display time (display start time, display end time) of the subtitle and the subtitle display priority information are inserted, in the header or the payload of the subtitle PES packet (see FIGS. 9 to 13).

In the TS formatter 116, the video stream generated by the video encoder 112, the audio stream generated by the audio encoder 113, and the subtitle stream generated by the subtitle encoder 115 are made into a transport packet to be multiplexed, and the transport stream TS as the multiplexed stream is generated.

When the streams are multiplexed in this way, under the control of the control unit 111, the subtitle PES packet is arranged at the random access position, that is, the position close to the position of the RAP target video PES packet, on the basis of the first time stamp (the time stamp inserted in the time stamp insertion position of the header).

In addition, at this time, under the control of the control unit 111, on the basis of the management information on the audio PES packet to be the RAP target, the audio PES packet to be the RAP target is arranged at the random access position, that is, the position close to the position of the RAP target video PES packet.

In addition, in the TS formatter 116, the identification information is inserted in the transport stream TS. The identification information indicates that the second time stamp (subtitle original display time stamp) and the subtitle priority information are inserted in the subtitle PES packet. That is, in the TS formatter 116, the subtitle rap descriptor (Subtitle_rap_descriptor) in which the identification information is described is arranged in the subtitle elementary stream loop corresponding to the subtitle stream under the program map table (Program Map Table (PMT)) (see FIGS. 15(a) to 15(b)).

[Example Configuration of Television Receiver]

Figure 17:
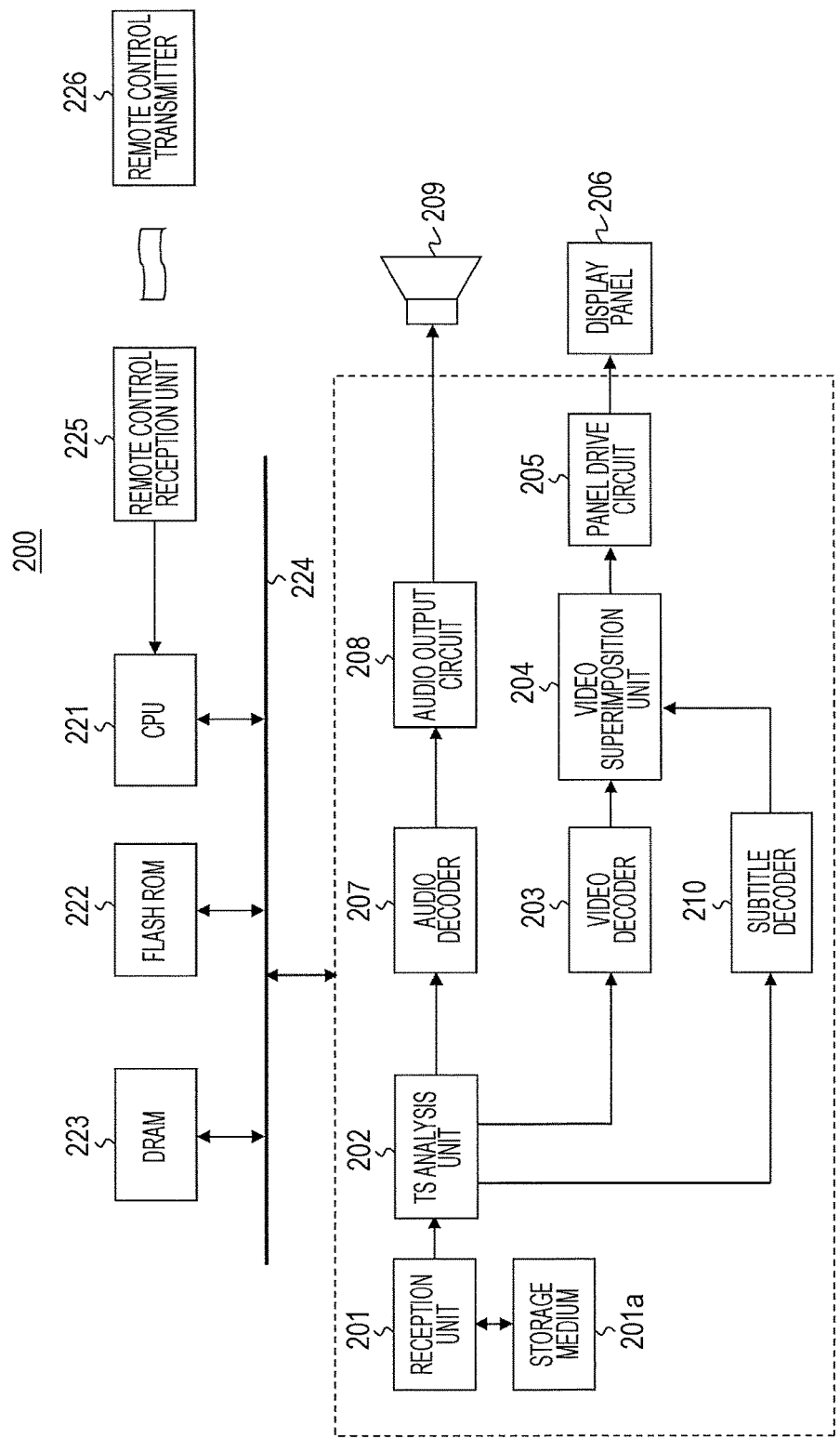
FIG. 17 is a diagram showing an example configuration of a television receiver.

FIG. 17 shows an example configuration of the television receiver 200. The television receiver 200 includes a reception unit 201, a TS analysis unit (demultiplexer) 202, a video decoder 203, a video superimposition unit 204, a panel drive circuit 205, and a display panel 206. In addition, the television receiver 200 includes an audio decoder 207, an audio output circuit 208, a speaker 209, and a subtitle decoder 210. In addition, the television receiver 200 includes a CPU 221, flash ROM 222, DRAM 223, an internal bus 224, a remote control reception unit 225, and a remote control transmitter 226.

The CPU 221 controls operation of each unit of the television receiver 200. The flash ROM 222 stores control software and keeps data. The DRAM 223 configures a work area of the CPU 221. The CPU 221 deploys the software and the data read from the flash ROM 222 on the DRAM 223 to start the software, and controls each unit of the television receiver 200.

The remote control reception unit 225 receives a remote control signal (remote control code) transmitted from the remote control transmitter 226, and supplies the signal to the CPU 221. The CPU 221 controls each unit of the television receiver 200 on the basis of the remote control code. The CPU 221, the flash ROM 222, and the DRAM 223 are connected to the internal bus 224.

The reception unit 201 receives the transport stream TS loaded on the broadcast wave and transmitted from the broadcast transmission system 100. The transport stream TS includes the video stream, the audio stream, and the subtitle stream, as described above. The TS analysis unit 202 extracts the PES packet of each of the video, audio, and subtitle streams, from the transport stream TS.

Here, the transport stream TS received by the reception unit 201 is temporarily stored in a storage medium (buffer or storage) 201a, and a portion corresponding to a reproduction mode is taken out and transmitted to the TS analysis unit 202. For example, in the normal reproduction mode, all the accumulated portion is transmitted to the TS analysis unit 202. On the other hand, in the variable speed reproduction mode, some intermittent portion according to the multiplied speed including a portion of the RAP position (random access position) is transmitted to the TS analysis unit 202. In particular, in a RAP reproduction mode, only a portion of the RAP position (random access position) is transmitted to the TS analysis unit 202.

In addition, the TS analysis unit 202 extracts various types of information inserted in the transport stream TS, and transmits the information to the CPU 221. The information also includes information on the subtitle rap descriptor (Subtitle_rap_descriptor). With this configuration, the CPU 221 can easily recognize that the second time stamp (subtitle original display time stamp) and the subtitle display priority information are inserted in the subtitle PES packet, and the insertion place thereof, and can effectively use them for the control of the subtitle decoder 210.

The audio decoder 207 performs decoding processing to the audio PES packet extracted by the TS analysis unit 202, and obtains audio data. The audio output circuit 208 performs necessary processing, such as D/A conversion or amplification, to the audio data, and supplies the data to the speaker 209. The video decoder 203 performs decoding processing to the video PES packet extracted by the TS analysis unit 202 to obtain image data.

Decoding processing and outputting processing for the PES packets in the audio decoder 207 and the video decoder 203 are controlled in accordance with the time stamp inserted in the header in the normal reproduction mode, but not controlled in accordance with the time stamp and immediately performed after the supply from the TS analysis unit 202 in the variable speed reproduction mode.

The subtitle decoder 210 performs decoding processing to the subtitle PES packet extracted by the TS analysis unit 202 to obtain bitmap data of each region to be superimposed on the image data. Decoding processing and outputting processing for the subtitle PES packet in the subtitle decoder 210 are controlled in accordance with the second time stamp (subtitle original display time stamp) inserted in the header or the payload in the normal reproduction mode, but not controlled in accordance with the second time stamp and immediately performed after the supply from the TS analysis unit 202 in the variable speed reproduction mode.

Figure 18:
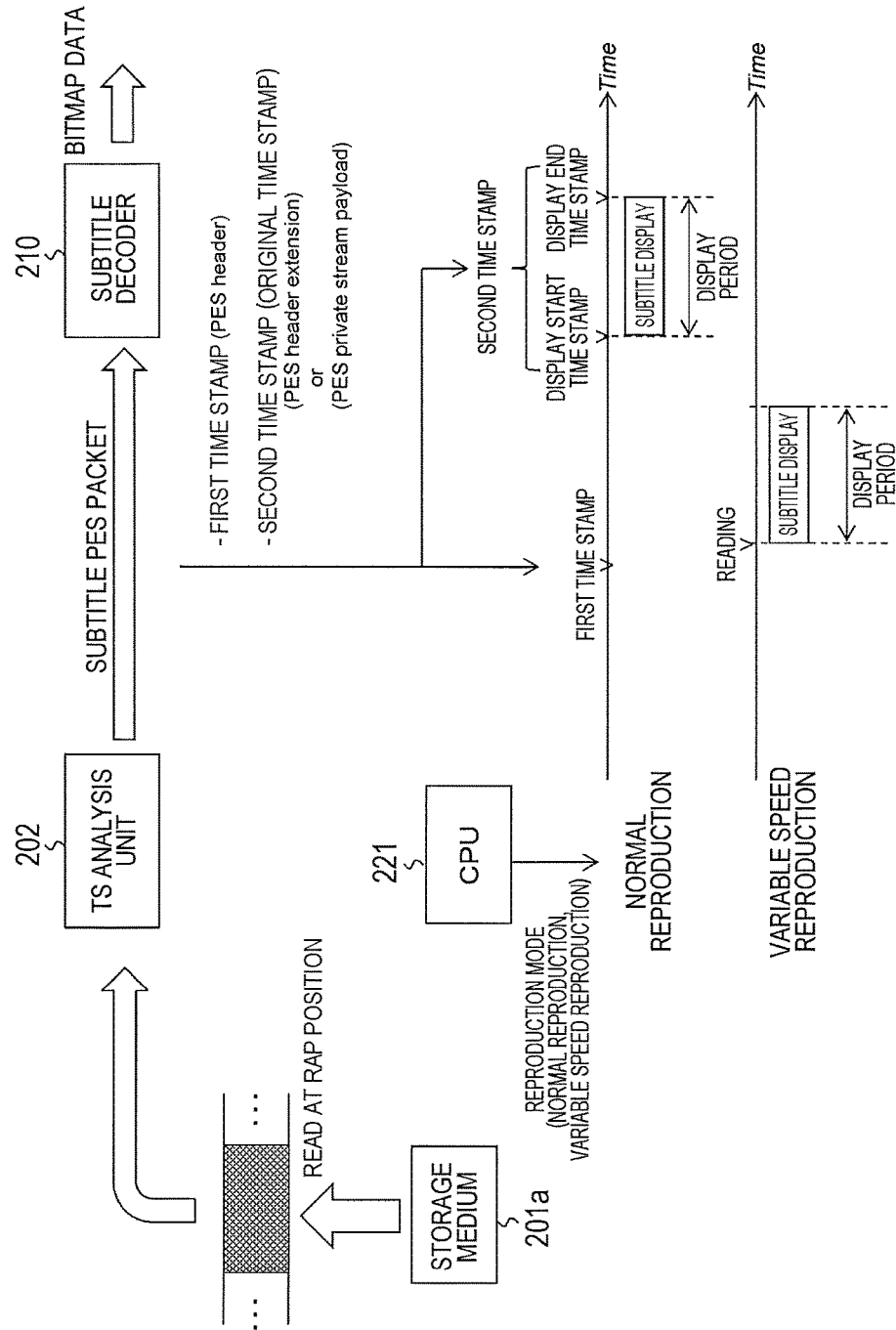
FIG. 18 is a diagram schematically showing processing timings of decoding and outputting for a subtitle PES packet read at a Random Access Point (RAP) position.

FIG. 18 schematically shows processing timings of decoding and outputting for the subtitle PES packet read at the RAP position, for example. In a case of the normal reproduction mode, decoding is completed by the time indicated by the display start time stamp, and output of the bitmap data as a decoding result is started from the time and continued until the time indicated by the display end time stamp. In this case, time from the time indicated by the display start time stamp to the time indicated by the display end time stamp is a subtitle display period.

On the other hand, in a case of the variable speed reproduction mode, decoding is immediately performed after reading from the storage medium 201a, and output of the bitmap data as a decoding result is started. Duration of the output is a subtitle display period. The duration of the output is, for example, time from the relative start time "begin" to the relative end time "end" included in the TTML body (the same as the time from the time indicated by the display start time stamp to the time indicated by the display end time stamp described above).

In the variable speed reproduction mode, in a case of N times speed (N>1), an overlap period may occur in display periods of a plurality of subtitles. The probability that the overlap period occurs increases as the multiplied speed increases. The CPU 221 determines whether the overlap period occurs in the display period of each subtitle, on the basis of information such as an interval of the start time of each subtitle obtained in accordance with the multiplied speed, and the display period of each subtitle.

Then, the CPU 221, when the overlap period occurs in the display periods of the plurality of subtitles, performs selection of which subtitle to be displayed on the basis of the subtitle display priority information, and controls the subtitle decoder 210 to output only a decoding result (bitmap data) of a selected subtitle.

Figure 19:
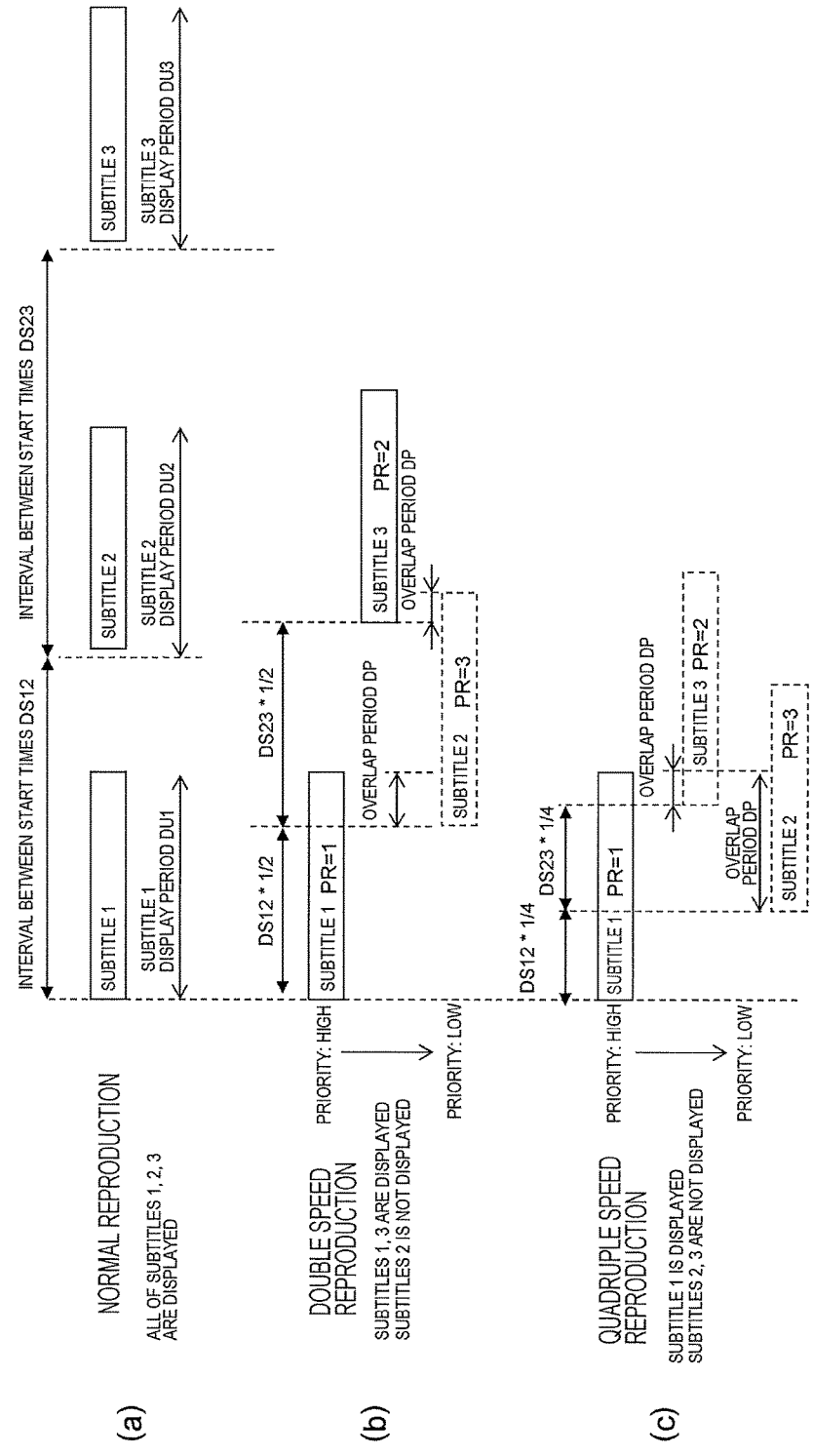
FIGS. 19(a) to 19(c) are diagrams each showing an example of a subtitle display sequence in a variable speed reproduction mode.

FIGS. 19(a) to 19(c) each show an example of a subtitle display sequence in the variable speed reproduction mode. FIG. 19(a) shows an example of a case of the normal reproduction. Display periods of the subtitles 1, 2, and 3 are DU1, DU2, and DU3, respectively. The interval between the start times of the subtitle 1 and the subtitle 2 is DS12, and is longer than the display period DU1 of the subtitle 1. In addition, the interval between the start times of the subtitle 2 and the subtitle 3 is DS23, and is longer than the display period DU2 of the subtitle 2. In the case of the normal reproduction, all of the subtitles 1, 2, and 3 are displayed.

FIG. 19(b) shows an example of a case of double speed reproduction. The interval between the start times of the subtitle 1 and the subtitle 2 is DS12*½. For that reason, an overlap period DP occurs in the display periods of the subtitles 1 and 2. In addition, the interval between the start times of the subtitle 2 and the subtitle 3 is DS23*½. For that reason, an overlap period DP occurs in the display periods of the subtitles 2 and 3. Here, it is assumed that display priorities PR of the subtitles 1, 2, and 3 are "1", "3", and "2", respectively.

In this case, between the subtitle 1 and the subtitle 2, the subtitle 1 with a higher priority is selected as a subtitle to be displayed, and further, the subtitle 3 is selected as a subtitle to be displayed. That is, in the case of the double speed reproduction, the subtitles 1 and 3 are displayed, and the subtitle 2 is not displayed.

FIG. 19(c) shows an example of a case of quadruple speed reproduction. The interval between the start times of the subtitle 1 and the subtitle 2 is DS12*¼. In addition, the interval between the start times of the subtitle 2 and the subtitle 3 is DS23*¼. For that reason, an overlap period DP occurs in the display periods of the subtitles 1 and 2, and further an overlap period DP occurs in the display periods of subtitles 1 and 3. In this case, among the subtitles 1, 2, and 3, the subtitle 1 with the highest priority is selected as a subtitle to be displayed. That is, in the case of the quadruple speed reproduction, the subtitle 1 is displayed, and the subtitles 2 and 3 are not displayed.

Figure 20:
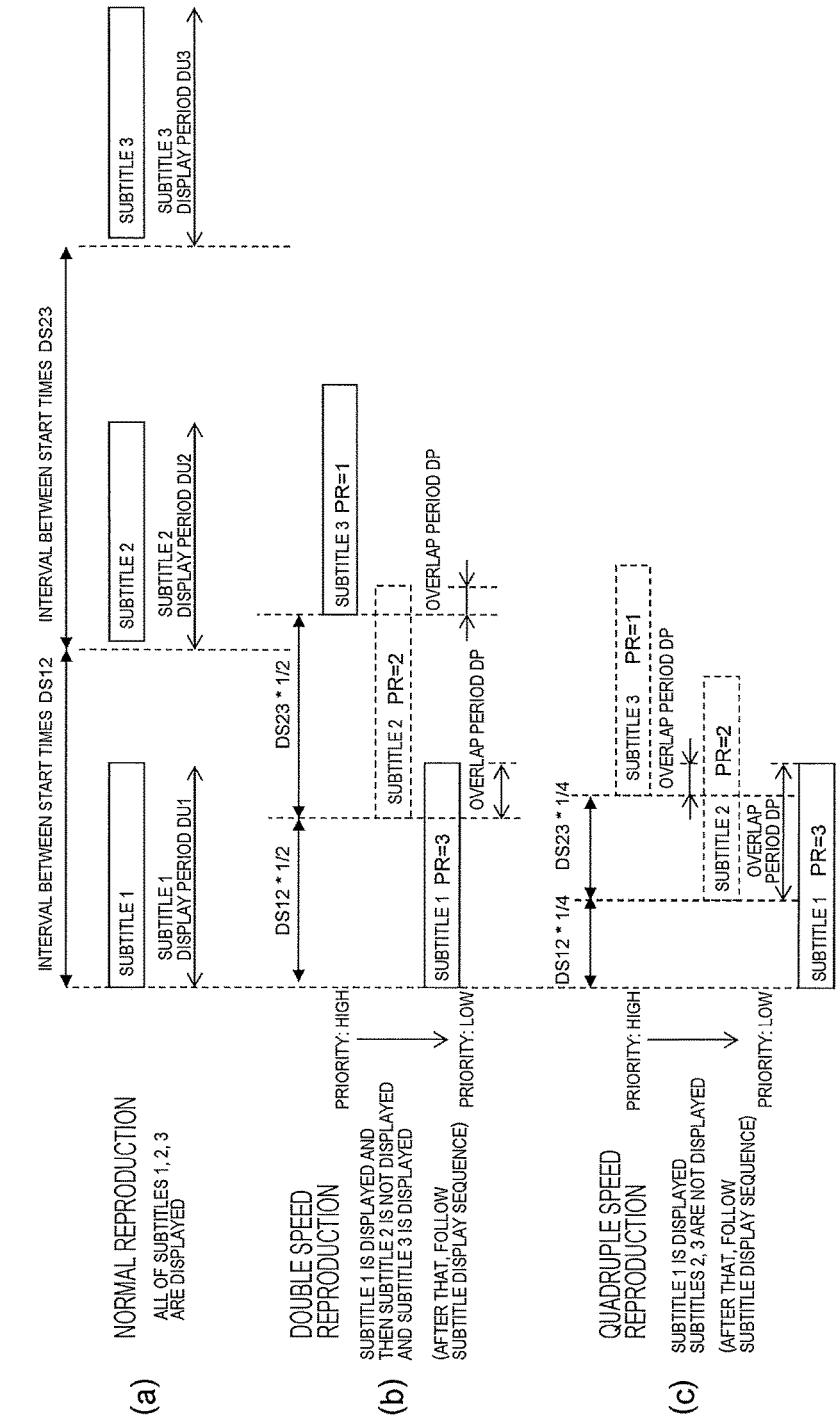
FIGS. 20(a) to 20(c) are diagrams showing a selection example of a displayed subtitle at the beginning of reproduction applied during transition from normal reproduction to N times speed.

FIGS. 20(a) to 20(c) show a selection example of a displayed subtitle at the beginning of reproduction applied during transition from the normal reproduction to the N times speed. FIG. 20(a) shows an example of a case of the normal reproduction. Display periods of the subtitles 1, 2, and 3 are DU1, DU2, and DU3, respectively. The interval between the start times of the subtitle 1 and the subtitle 2 is DS12, and is longer than the display period DU1 of the subtitle 1. In addition, the interval between the start times of the subtitle 2 and the subtitle 3 is DS23, and is longer than the display period DU2 of the subtitle 2. In the case of the normal reproduction, all of the subtitles 1, 2, and 3 are displayed.

FIG. 20(b) shows an example of a case during transition from the normal reproduction to the double speed reproduction. The interval between the start times of the subtitle 1 and the subtitle 2 is DS12*½. For that reason, an overlap period DP occurs in the display periods of the subtitles 1 and 2. In addition, the interval between the start times of the subtitle 2 and the subtitle 3 is DS23*½. For that reason, an overlap period DP occurs in the display periods of the subtitles 2 and 3. Here, it is assumed that display priorities PR of the subtitles 1, 2, and 3 are "3", "2", and "1", respectively.

In this case, between the subtitle 1 and the subtitle 2, the subtitle 1 with the first start time is selected as a subtitle to be displayed, not the subtitle 2 with a higher priority, and further, the subtitle 3 is selected as a subtitle to be displayed. That is, in the case during transition from the normal reproduction to double speed reproduction, the subtitle 1 is displayed, and then the subtitle 2 is not displayed and the subtitle 3 is displayed. Incidentally, after the subtitle 3 is displayed, a subtitle to be displayed is selected in accordance with the subtitle display sequence of the variable speed reproduction mode shown in FIGS. 19(a) to 19(c) described above.

FIG. 20(c) shows an example of a case during transition from the normal reproduction to the quadruple speed reproduction. The interval between the start times of the subtitle 1 and the subtitle 2 is DS12*¼. In addition, the interval between the start times of the subtitle 2 and the subtitle 3 is DS23*¼. For that reason, an overlap period DP occurs in the display periods of the subtitles 1 and 2, and further an overlap period DP occurs in the display periods of subtitles 1 and 3.

In this case, the subtitle 1 with the first start time is selected as a subtitle to be displayed, not the subtitle 3 with the highest priority among the subtitles 1, 2, and 3. Incidentally, after the subtitle 1 is displayed, a subtitle to be displayed is selected in accordance with the subtitle display sequence of the variable speed reproduction mode shown in FIGS. 19(a) to 19(c) described above.

Returning to FIG. 17, the video superimposition unit 204 superimposes the bitmap data of each region obtained from the subtitle decoder 210 on the image data obtained by the video decoder 203. The panel drive circuit 205 drives the display panel 206 on the basis of the image data for display obtained by the video superimposition unit 204. The display panel 206 is configured by, for example, a Liquid Crystal Display (LCD), an organic electroluminescence (EL) display.

Operation of the television receiver 200 shown in FIG. 17 is briefly described. In the reception unit 201, the transport stream TS is received loaded on the broadcast wave and transmitted from the broadcast transmission system 100. The transport stream TS includes the video stream, the audio stream, and the subtitle stream.

The transport stream TS is supplied to the TS analysis unit 202 through the storage medium 201a. In this case, a portion corresponding to the reproduction mode is taken out to be transmitted to the TS analysis unit 202. For example, in the normal reproduction mode, all the accumulated portion is transmitted to the TS analysis unit 202. On the other hand, in the variable speed reproduction mode, some intermittent portion according to the multiplied speed including a portion of the RAP position (random access position) is transmitted to the TS analysis unit 202. In particular, in a RAP reproduction mode, only a portion of the RAP position (random access position) is transmitted to the TS analysis unit 202.

The video PES packet extracted by the TS analysis unit 202 is supplied to the video decoder 203. In the video decoder 203, decoding processing is performed to the video PES packet extracted by the TS analysis unit 202, and the image data is obtained. Decoding processing and outputting processing for each video PES packet are controlled in accordance with the time stamp inserted in the header in the normal reproduction mode, but not controlled in accordance with the time stamp and immediately performed after the supply from the TS analysis unit 202 in the variable speed reproduction mode. The image data is supplied to the video superimposition unit 204.

In addition, the subtitle stream (PES stream) extracted by the TS analysis unit 202 is supplied to the subtitle decoder 210. In the subtitle decoder 210, segment data of each region is processed, and the bitmap data of each region to be superimposed on the image data is obtained. Decoding processing and outputting processing for each subtitle PES packet are controlled in accordance with the second time stamp (original time stamp) inserted in the header or the payload in the normal reproduction mode, but not controlled in accordance with the second time stamp and immediately performed after the supply from the TS analysis unit 202 in the variable speed reproduction mode (see FIG. 18).

In addition, in the variable speed reproduction mode, in a case of N times speed (N>1), an overlap period may occur in the display periods of the plurality of subtitles. In the CPU 221, it is determined whether the overlap period occurs in the display period of each subtitle, on the basis of the information such as the interval of the start time of each subtitle obtained in accordance with the multiplied speed, and the display period of each subtitle. Then, in the CPU 221, when the overlap period occurs in the display periods of the plurality of subtitles, selection of which subtitle to be displayed is performed on the basis of the subtitle display priority information, and the subtitle decoder 210 is controlled to output only a decoding result (bitmap data) of a selected subtitle (see FIGS. 19(a) to 19(c), FIGS. 20(a) to 20(c)).

The bitmap data of each region output from the subtitle decoder 210 is supplied to the video superimposition unit 204. In the video superimposition unit 204, the bitmap data of each region output from the subtitle decoder 210 is superimposed on the image data obtained by the video decoder 203.

The image data for display obtained by the video superimposition unit 204 is supplied to the panel drive circuit 205. In the panel drive circuit 205, the display panel 206 is driven on the basis of the video data for display. With this configuration, an image on which the subtitle is superimposed is displayed on the display panel 206. In this case, a normal reproduction image at normal speed is displayed in the normal reproduction mode, and a variable speed reproduction image according to the multiplied speed is displayed in the variable speed reproduction mode.

In addition, the audio PES packet extracted by the TS analysis unit 202 is supplied to the audio decoder 207. In the audio decoder 207, decoding processing is performed to the audio PES packet, and audio data is obtained. Decoding processing and outputting processing for each audio PES packet are controlled in accordance with the time stamp inserted in the header in the normal reproduction mode, but not controlled in accordance with the time stamp and immediately performed after the supply from the TS analysis unit 202 in the variable speed reproduction mode.

The audio data is supplied to the audio output circuit 208. In the audio output circuit 208, necessary processing, such as D/A conversion or amplification, is performed to the audio data. Then, the audio data after processing is supplied to the speaker 209. With this configuration, audio output corresponding to the display image on the display panel 206 is obtained from the speaker 209.

As described above, in the transmission/reception system 10 shown in FIG. 1, the subtitle display priority information is inserted in the header or the payload of the subtitle PES packet. For that reason, in the case where the overlap period occurs in the display periods of the plurality of subtitles in the variable speed reproduction mode (in the case of N times speed (N>1)), selection of which subtitle to be displayed is facilitated by referring to the priority information, and satisfactory subtitle display reflecting an intention of the production side becomes possible.

In addition, in the transmission/reception system 10 shown in FIG. 1, in the transport stream TS, the identification information is inserted indicating that the subtitle display priority information is inserted in the subtitle PES packet. For that reason, in the receiving side, it can be easily recognized that the subtitle display priority information is inserted on the basis of the identification information, and the subtitle display priority information can be efficiently extracted.

In addition, in the transmission/reception system 10 shown in FIG. 1, in generating the transport stream TS as the multiplexed stream in the transmission side, the subtitle PES packet is arranged in the random access position. For that reason, in the receiving side, the subtitle PES packet can be taken out together when the video PES packet at the random access position is taken out from the multiplexed stream, and subtitle display processing in the variable speed reproduction mode is simplified.

For example, FIGS. 21(a) to 21(f) show conventional multiplexing. FIG. 21(a) shows a video PES packet row configuring a video stream. "V_TS00", "V_TS10", "V_TS20", "V_TS30", . . . , each show a time stamp inserted in the header, and "V0", "V10", "V20", "V30", . . . , each show encoded image data arranged in the payload.

FIG. 21(b) shows an audio PES packet row configuring an audio stream. "A_TS00", "A_TS10", "A_TS20", "A_TS30", each show a time stamp inserted in the header, and "A0", "A10", "A20", "A30", . . . , each show encoded audio data arranged in the payload.

FIG. 21(c) shows a subtitle PES packet row configuring a subtitle stream. "S_TS15", "S_TS19", "S_TS35", "A_TS39", . . . , each show a time stamp inserted in the header, and "S15", "S19", "S35", "S39", . . . , each show subtitle information arranged in the payload. In the header of the subtitle PES packet, the time stamp is inserted regardless of the time stamp inserted in the header of the video PES packet or the audio PES packet.

FIG. 21(d) shows an example of arrangement of each PES packet in a multiplexed stream (transport stream TS). In multiplexing, the time stamp inserted in the header of each PES packet is referred to, and arrangement of each PES packet is determined. In this case, the subtitle PES packet is arranged at a position slightly before the display period regardless of the RAP position (random access position).

In RAP reproduction, for example, as shown in a reproduction method 1 of FIG. 21(e), the PES packet is read with a certain length and decoding processing is performed for each RAP position, and image display and audio output are performed. In this case, since the subtitle PES packet is not necessarily arranged at the RAP position, subtitle display is not performed.

Incidentally, also in the RAP reproduction, to perform subtitle display, it can be considered that reading of the subtitle PES packet is also performed besides reading of the RAP position, as shown in a reproduction method 2 of FIG. 21(f). In this case, it is necessary to repeat jump for reading the subtitle PES packet besides jump for reading the RAP position, and reproduction processing becomes complicated. In addition, since it also results in waiting for image display and audio output until reading of the subtitle PES packet, delay in image display and audio output occurs.

FIGS. 22(a) to 22(e) show multiplexing of the present technology. FIG. 22(a) shows a video PES packet row configuring a video stream. "V_TS00", "V_TS10", "V_TS20", "V_TS30", . . . , each show a time stamp inserted in the header, and "V0", "V10", "V20", "V30", . . . , each show encoded image data arranged in the payload.

FIG. 22(b) shows an audio PES packet row configuring an audio stream. "A_TS00", "A_TS10", "A_TS20", "A_TS30", each show a time stamp inserted in the header, and "A0", "A10", "A20", "A30", . . . , each show encoded image data arranged in the payload.

FIG. 22(c) shows a subtitle PES packet row configuring a subtitle stream. "S_TS10", "S_TS30", . . . , each show a time stamp inserted in the header, and "S10", "S130", . . . , each show subtitle information arranged in the payload. In the header of the subtitle PES packet, the time stamp (first time stamp) is inserted of a value equal to or close to the time stamp inserted in the header of the RAP target video PES packet.

FIG. 22(d) shows an example of arrangement of each PES packet in a multiplexed stream (transport stream TS). In multiplexing, the time stamp inserted in the header of each PES packet is referred to, and arrangement of each PES packet is determined. In this case, similarly to the RAP target video PES packet and the audio PES packet, the subtitle PES packet is arranged at the RAP position (random access position).

In RAP reproduction, for example, as shown in a reproduction method 3 of FIG. 22(e), the PES packet is read with a certain length and decoding processing is performed for each RAP position. In this case, the subtitle PES packet is also read to be subjected to decoding processing together with the video PES packet and the audio PES packet, so that subtitle display is also satisfactorily performed together with image display and audio output.

Multiplexing is performed as in the present technology in this way, whereby it is not necessary to repeat jump for reading the subtitle PES packet besides jump for reading the RAP position as the reproduction method 2 shown in FIG. 21(f), and variable speed reproduction processing in the receiving side for enabling subtitle display is simplified.

In addition, in the transmission/reception system 10 shown in FIG. 1, the second time stamp (subtitle original display time stamp) indicating the display time of the subtitle is inserted in the header or the payload of the subtitle PES packet. For that reason, in the receiving side, display timing of the subtitle can be easily controlled on the basis of the subtitle original display time stamp.

In addition, in the transmission/reception system 10 shown in FIG. 1, in the transport stream TS, identification information is inserted indicating that the subtitle original display time stamp is inserted in the subtitle PES packet. For that reason, in the receiving side, it can be easily recognized that the subtitle original display time stamp is inserted on the basis of the identification information, and the subtitle original display time stamp can be efficiently extracted.

2. Modifications

Incidentally, in the above embodiment, an example has been shown in which the subtitle PES packet is arranged at the random access position in generating the transport stream TS as the multiplexed stream in the transmission side. However, even in a case where the subtitle PES packet is not arranged at the random access position in this way, the technology can be applied of inserting the subtitle display priority information in the header or the payload of the subtitle PES packet. Also in this case, in the case where the overlap period occurs in the display periods of the plurality of subtitles in the variable speed reproduction mode (in the case of N times speed (N>1)), selection of which subtitle to be displayed is facilitated by referring to the priority information, and satisfactory subtitle display reflecting an intention of the production side becomes possible.

In addition, in the above embodiment, an example has been shown in which TTML is used as text information of a subtitle of a predetermined format having display timing information. However, the present technology is not limited thereto, and it can be considered to use another timed text information having information equivalent to TTML. For example, a derived format of TTML may be used. In addition, it is obvious that even in a case where the format of the subtitle is a conventional type bitmap system the present technology can be applied similarly.

In addition, in the above embodiment, the transmission/reception system 10 configured by the broadcast transmission system 100 and the television receiver 200 has been shown; however, the configuration of the transmission/reception system to which the present technology can be applied is not limited thereto. For example, the television receiver 200 may have a configuration of a set top box and a monitor connected together via a digital interface such as High-Definition Multimedia Interface (HDMI). Incidentally, "HDMI" is a registered trademark.

In addition, the present technology may also be embodied in the configurations described below.

(1) A transmission device including:
a video encoding unit that generates a video stream configured by a video packet having encoded image data in a payload;
a subtitle encoding unit that generates a subtitle stream configured by a subtitle packet that has subtitle information in a payload and in which subtitle di splay priority information according to the subtitle information is inserted;
a multiplexed stream generation unit that generates a multiplexed stream including the video stream and the subtitle stream; and
a transmission unit that transmits the multiplexed stream.
(2) The transmission device according to the (1), in which
the subtitle encoding unit
inserts the priority information in a header or a payload of the subtitle packet.
(3) The transmission device according to the (1) or (2), in which
the multiplexed stream generation unit
inserts identification information indicating that the priority information is inserted in the subtitle packet, in the multiplexed stream.
(4) The transmission device according to the (3), in which
information indicating an insertion position is added to the identification information.
(5) The transmission device according to any of the (1) to (4), in which
the multiplexed stream generation unit
arranges the subtitle packet at a random access position.
(6) The transmission device according to any of the (1) to (5), in which
the video packet and the subtitle packet are PES packets, and
the multiplexed stream is an MPEG2 transport stream.
(7) The transmission device according to any of the (1) to (6), in which
the subtitle information is text information of a subtitle of a predetermined format having display timing information.
(8) A transmission method including:
a video encoding step of generating a video stream configured by a video packet having encoded image data in a payload;
a subtitle encoding step of generating a subtitle stream configured by a subtitle packet that has subtitle information in a payload and in which subtitle display priority information according to the subtitle information is inserted;
a multiplexed stream generation step of generating a multiplexed stream including the video stream and the subtitle stream; and
a transmission step of transmitting the multiplexed stream by a transmission unit.
(9) A reproduction device including:
a variable speed reproduction processing unit that performs variable speed reproduction processing to a multiplexed stream including a subtitle stream configured by a video stream configured by a video packet having encoded image data in a payload, and a subtitle packet that has subtitle information in a payload and in which subtitle display priority information according to the subtitle information is inserted; and
a subtitle display control unit that controls display of a subtitle according to subtitle information included in each subtitle packet on the basis of the priority information when variable speed reproduction processing is performed to the multiplexed stream by the variable speed reproduction processing unit.

(10) The reproduction device according to the (9), in which
the display control unit performs control such that only a subtitle with the highest priority is displayed when an overlap period occurs in a display period of the subtitle according to a plurality of pieces of subtitle information.
(11) A reproduction method including:
a variable speed reproduction processing step of performing variable speed reproduction processing to a multiplexed stream including a subtitle stream configured by a video stream configured by a video packet having encoded image data in a payload and a subtitle packet that has subtitle information in a payload and in which subtitle display priority information according to the subtitle information is inserted; and
a subtitle display control step of controlling display during the variable speed reproduction of a subtitle according to subtitle information included in a payload of each subtitle packet included in the subtitle stream, on the basis of the priority information, by a display control unit.

The main feature of the present technology is that the subtitle display priority information is inserted in the header or the payload of the subtitle PES packet, whereby in the case where the overlap period occurs in the display periods of the plurality of subtitles in the variable speed reproduction mode (in the case of N times speed (N>1)), selection of which subtitle to be displayed is facilitated by referring to the priority information, and satisfactory subtitle display reflecting an intention of the production side becomes possible (see FIGS. 19(a) to 19(c)).

REFERENCE SIGNS LIST

10 Transmission/reception system
100 Broadcast transmission system
110 Stream generation unit
111 Control unit
112 Video encoder
113 Audio encoder
114 Text format conversion unit
115 Subtitle encoder
116 TS formatter
120 Timing management unit
121 Video timing management unit
122 Audio timing management unit
123 RAP timing management unit
124 Subtitle display timing management unit
200 Television receiver
201 Reception unit
201a Storage medium
202 TS analysis unit
203 Video decoder
204 Video superimposition unit
205 Panel drive circuit
206 Display panel
207 Audio decoder
208 Audio output circuit
209 Speaker
210 Subtitle decoder
221 CPU

The invention claimed is:
1. A transmission device, comprising:
circuitry configured to:
generate a video stream that includes a video packet having encoded image data in a payload of the video packet;

generate a subtitle stream that includes a subtitle packet having subtitle information in a payload of the subtitle packet and subtitle display priority information corresponding to the subtitle information;

generate a multiplexed stream including the video stream and the subtitle stream; and set a flag included in a stream level descriptor of the multiplexed stream, the flag being set to indicate that the subtitle display priority information is included in the subtitle packet; and transmitter configured to transmit the multiplexed stream.

2. The transmission device according to claim 1, wherein the circuitry is further configured to arrange the subtitle display priority information in either a header or a payload of the subtitle packet.

3. The transmission device according to claim 1, wherein the circuitry is further configured to set position information in the stream level descriptor of the multiplexed stream, the position information indicating whether the subtitle display priority information is at a header or a payload of the subtitle packet.

4. The transmission device according to claim 1, wherein the circuitry is further configured to arrange the subtitle packet at a random access position of the multiplexed stream.

5. The transmission device according to claim 1, wherein the video packet and the subtitle packet are PES packets, and the multiplexed stream is an MPEG2 transport stream.

6. The transmission device according to claim 1, wherein the subtitle information is text information of a subtitle of a predetermined format having display timing information.

7. A transmission method, comprising:

generating a video stream that includes a video packet having encoded image data in a payload of the video packet;

generating, by circuitry of a transmission device, a subtitle stream that includes a subtitle packet having subtitle information in a payload of the subtitle packet and subtitle display priority information corresponding to the subtitle information;

generating a multiplexed stream including the video stream and the subtitle stream;

setting, by the circuitry of the transmission device, a flag included in a stream level descriptor of the multiplexed stream, the flag being set to indicate that the subtitle display priority information is included in the subtitle packet; and transmitting, by a transmitter of the transmission device, the multiplexed stream.

8. A reproduction device, comprising:

a receiver configured to receive a multiplexed stream, the multiplexed stream including a video stream that includes a video packet having encoded image data in a payload of the video packet, a subtitle stream that includes a subtitle packet having subtitle information in a payload of the subtitle packet, and a flag included in a stream level descriptor of the multiplexed stream, the flag indicating whether subtitle display priority information corresponding to the subtitle information is included in the subtitle packet, wherein the subtitle packet further includes the subtitle display priority information when the flag indicates that the subtitle display priority information is included in the subtitle packet; and circuitry configured to:

reproduce the video stream at a speed different from a normal speed of the video stream; and when the flag indicates that the subtitle display priority information is included in the subtitle packet, control display of a subtitle included in the subtitle information based on the subtitle display priority information corresponding to the subtitle information.

9. The reproduction device according to claim 8, wherein the circuitry is further configured to cause the subtitle to be displayed when, at a starting time of the subtitle, the subtitle has a highest priority according to the subtitle display priority information and no other subtitle is displayed.

10. A reproduction method, comprising:

receiving, by a receiver of a reproduction device, a multiplexed stream, the multiplexed stream including a video stream that includes a video packet having encoded image data in a payload of the video packet, a subtitle stream that includes a subtitle packet having subtitle information in a payload of the subtitle packet, and a flag included in a stream level descriptor of the multiplexed stream, the flag indicating whether subtitle display priority information corresponding to the subtitle information is included in the subtitle packet, wherein the subtitle packet further includes the subtitle display priority information when the flag indicates that the subtitle display priority information is included in the subtitle packet;

reproducing the video stream at a speed different from a normal speed of the video stream; and when the flag indicates that the subtitle display priority information is included in the subtitle packet, controlling, by circuitry of the reproduction device, display of a subtitle included in the subtitle information based on the subtitle display priority information corresponding to the subtitle information.

* * * * *